US009692498B2

(12) United States Patent
Fan et al.

(10) Patent No.: US 9,692,498 B2
(45) Date of Patent: Jun. 27, 2017

(54) EXTENDING WIRELESS SIGNAL COVERAGE WITH DRONES

(71) Applicant: AT&T Intellectual Property I, L.P., Atlanta, GA (US)

(72) Inventors: James W. Fan, San Ramon, CA (US); Venson Shaw, Kirkland, WA (US); Jeffrey A. Aaron, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/885,679

(22) Filed: Oct. 16, 2015

(65) Prior Publication Data

US 2017/0111102 A1  Apr. 20, 2017

(51) Int. Cl.
H04W 4/00 (2009.01)
H04B 7/185 (2006.01)
H04W 64/00 (2009.01)
H04W 4/02 (2009.01)

(52) U.S. Cl.
CPC ........ H04B 7/18504 (2013.01); H04W 4/023 (2013.01); H04W 64/006 (2013.01)

(58) Field of Classification Search
CPC . H04W 16/26; H04W 36/18; H04W 52/0203; H04W 84/12
USPC ...................................... 455/7-25
See application file for complete search history.

(56) References Cited

U.S. PATENT DOCUMENTS

| 8,103,212 B1 * | 1/2012 | Pezeshkian | ........ H04B 7/15514 455/11.1 |
|---|---|---|---|
| 8,121,593 B2 | 2/2012 | Pandit et al. | |
| 8,948,927 B1 | 2/2015 | Piponi | |
| 2012/0165010 A1 | 6/2012 | Lee et al. | |
| 2014/0222374 A1 | 8/2014 | Lock et al. | |
| 2015/0270885 A1 | 9/2015 | Chang et al. | |

(Continued)

FOREIGN PATENT DOCUMENTS

| WO | 2013106278 | 7/2013 |
| WO | 2014014850 | 1/2014 |
| WO | 2015139733 | 9/2015 |

OTHER PUBLICATIONS

Torsten, Andre, et al., "Application-Driven Design of Aerial Communication Networks", Enabling Next-Generation Airborne Communications, IEEE Communications Magazine, May 2014 (9 pages).

(Continued)

*Primary Examiner* — Ronald Eisner
(74) *Attorney, Agent, or Firm* — Haynes and Boone, LLP

(57) ABSTRACT

Example methods, apparatus, systems and articles of manufacture (e.g., physical storage media) to extend wireless signal coverage with drones are disclosed. Example methods disclosed herein to extend wireless signal coverage include determining whether a status of a wireless communication link being received at a first device from a second device meets a trigger condition. Such disclosed example methods also include, after determining the status meets the trigger condition, deploying a drone to a target location determined based on a first device location associated with the first device and a second device location associated with the second device, the drone being equipped with a signal extender capable of extending the wireless communication link.

20 Claims, 17 Drawing Sheets

(56) References Cited

U.S. PATENT DOCUMENTS

2016/0028830 A1* 1/2016 Coglitore ............ H04L 67/2861
709/213

OTHER PUBLICATIONS

Quaritsch, M., et al., "Networked UAVs as aerial sensor network for disaster management applications", Springer-Verlag, Jan. 1, 2010 (8 pages).
Park, Kyung-Nam, et al., "Optimal Coverage Control for Net-Drone Handover", IEEE, 2015 (3 pages).
Campbell, Peter, "EE to use drones and balloons to boost 4G: 1.5bn to be spent on network improvements in rural areas", DailyMail.com, Feb. 11, 2015 (19 pages).

* cited by examiner

US 9,692,498 B2

EXTENDING WIRELESS SIGNAL COVERAGE WITH DRONES

FIELD OF THE DISCLOSURE

This disclosure relates generally to wireless networks and, more particularly, to extending wireless signal coverage with drones.

BACKGROUND

Wireless devices, such as smartphones, portable computers, tablets, etc., have pervaded modern society as they have the potential to provide a host of benefits, such as improving user productivity, providing on-the-go entertainment, increasing safety through connectivity, etc. However, such benefits can be quickly reduced or lost when a wireless device experiences a weak or loss of signal condition. For example, weak or loss of signal conditions can occur in today's wireless networks, such as third generation (3G) carrier networks, fourth generation (4G) carrier networks, WiFi local area networks (LANs), etc., due to any of a multitude of causes, such as, but not limited to, (i) a wireless device moving out-of-range of a network access point (e.g., a wireless router, a base station, etc.), (ii) one or more interior walls blocking the signal path, (iii) active interference from one or more sources, (iv) passive multipath interface resulting from the destructive combination of multiple signal reflections, (v) network congestion, etc. Prior approaches for improving weak and/or loss-of-signal conditions typically utilize signal extenders (e.g., such as repeaters, boosters, etc.) positioned at fixed locations to repeat or otherwise enhance average wireless signal quality at those fixed locations.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
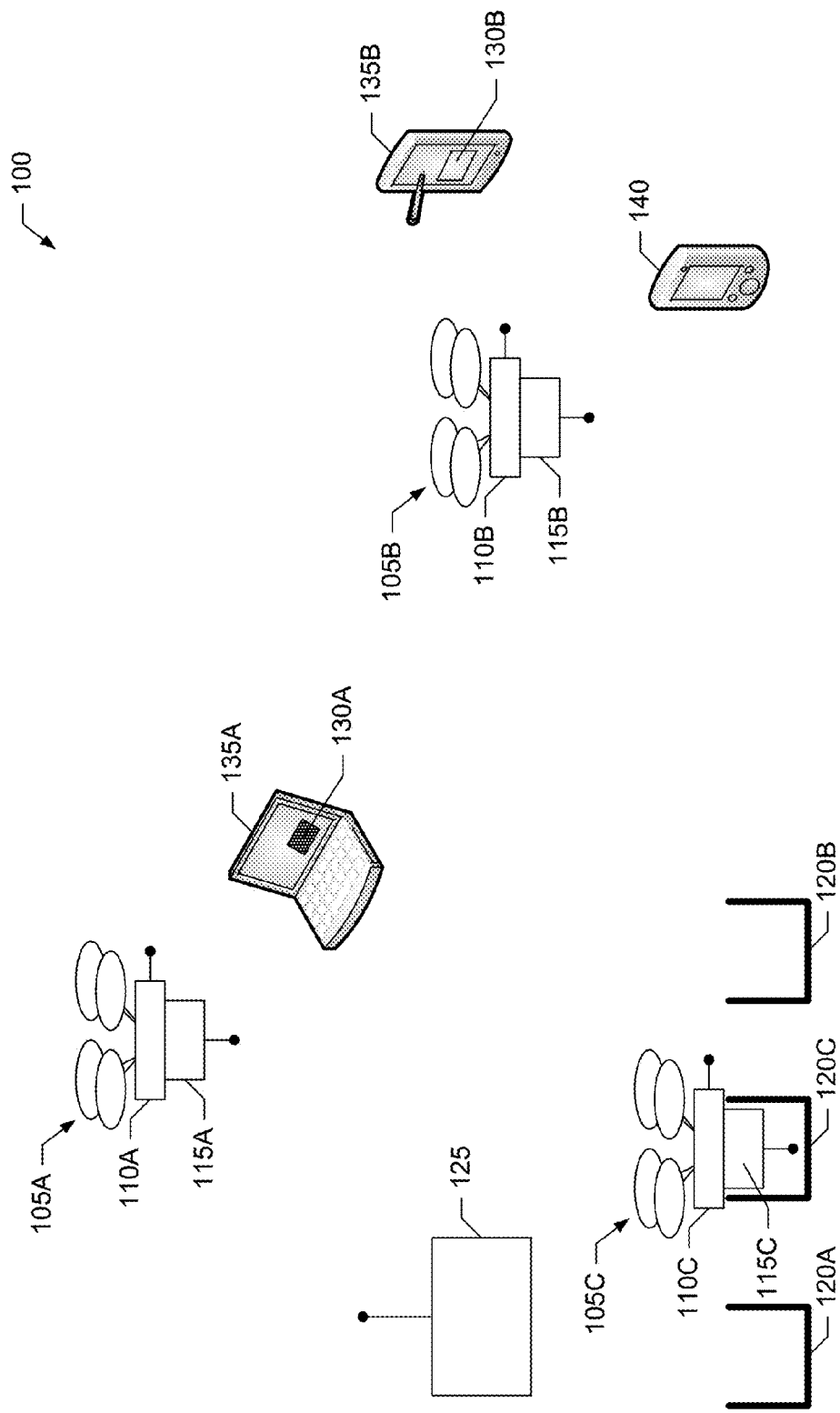
FIG. 1 is a block diagram of an example wireless signal extension system employing drones as signal extenders in accordance with the teachings of this disclosure.

Methods, apparatus, systems and articles of manufacture (e.g., physical storage media) to extend wireless signal coverage with drones are disclosed herein. Example methods disclosed herein to extend wireless signal coverage (e.g., which may be implemented by a disclosed example drone controller) include determining whether a status of a wireless communication link being received at a first device (e.g., a wireless device, such as a smartphone, a portable computer, a tablet, etc.) from a second device (e.g., a network access point, such as a wireless router, a femtocell, a base station, etc.) meets a trigger condition. Such disclosed example methods also include, after determining the status meets the trigger condition, deploying a drone, which is equipped with a signal extender capable of extending the wireless communication link, to a target location determined based on a first device location associated with the first device and a second device location associated with the second device.

Some such disclosed example methods further include, after determining the status meets the trigger condition, sending a first message to the first device to request authorization to deploy the drone, and deploying the drone to the target location in response to receiving a second message from the first device authorizing deployment of the drone. In some such disclosed examples, the drone is a first drone, the signal extender is a first signal extender, and the target location is a first target location. Some such disclosed example methods also include, in response to receiving the second message and determining a distance between the first device location and the second device location exceeds a signal extension range of the first drone: (i) determining the first target location to cause the first device location to be within the signal extension range of the first drone; (ii) determining a second target location intermediate the first target location and the second device location; (iii) deploying the first drone to the first target location; and (iv) deploying a second drone equipped with a second signal extender capable of extending the communication link to the second target location.

Additionally or alternatively, in some such disclosed examples, the status of the wireless communication link includes a received signal strength associated with the wireless communication link. In some such disclosed examples, the status is determined to meet the trigger condition when the received signal strength is below a threshold. Some such disclosed example methods further include determining the received signal strength from a measurement received from the first device.

Additionally or alternatively, some such disclosed example methods further include determining whether deployment of the drone is configured to be automatic, and when the deployment of the drone is configured to be automatic, deploying the drone to the target location automatically in response to determining the status meets the trigger condition. However, when the deployment of the drone is not configured to be automatic, some such disclosed example methods further include sending a first message to the first device to request authorization to deploy the drone, and deploying the drone to the target location in response to receiving a second message from the first device authorizing deployment of the drone.

Additionally or alternatively, in some such disclosed examples, the status is a first status, the wireless communication link is a first wireless communication link and the target location is a first target location. Some such disclosed example methods further include determining whether a second status of a second wireless communication link being received at a third device (e.g., another wireless device, such as a smartphone, a portable computer, a tablet, etc.) from the second device meets the trigger condition. Such disclosed example methods also include, after determining the second status meets the trigger condition: (i) redeploying the drone from first target location to a second target location determined based on a third device location associated with the third device and the second device location associated with the second device in response to determining the third device has higher priority than the first device, and (ii) maintaining the drone at the first target location in response to determining the first device has higher priority than the third device. For example, some such disclosed example methods may include identifying a first application that is active on the first device, identifying a second application that is active on the third device, and determining whether the second application is configured to have higher priority than the first application to determine whether the third device has higher priority than the first device.

Additionally or alternatively, some such disclosed example methods further include selecting the drone from a group of available drones based on a type of the wireless communication link and an identifier of the first device. In some such examples, respective ones of the available drones are associated with respective types of wireless communication links. Additionally or alternatively, in some such examples, the respective ones of the available drones are assigned to support respective ones of a plurality of devices including the first device.

Other example methods disclosed herein to extend wireless signal coverage (e.g., which may be implemented by a disclosed example drone) include navigating an example drone to a target location in response to a command received from a drone controller. Such disclosed example methods also include activating a signal extender to extend a wireless communication link between a first device (e.g., a wireless device, such as a smartphone, a portable computer, a tablet, etc.) and a second device (e.g., a network access point, such as a wireless router, a base station, etc.). Such disclosed example methods further include adjusting a position of the drone based on a first signal strength measured for a first wireless signal received from the first device and a second signal strength measured for a second wireless signal received from the second device.

Some such disclosed example methods also include reporting a status of a power source (e.g., battery, fuel cell, propellant, etc.) of the drone to the controller. In some such examples, the drone is a first drone and the command is a first command. Some such disclosed example methods further include transferring the signal extender from the first drone to a second drone in response to a second command received from the controller, and navigating the first drone to a docking station.

Additionally or alternatively, in some such examples, the drone is a first drone, the command is a first command and the wireless communication link is a first wireless communication link. Some such disclosed example methods further include sending an indication to the drone controller when at least one of the first signal strength or the second signal strength falls below a threshold. Some such disclosed example methods also include, in response to a second command received from the drone controller, establishing a second communication link with a second drone to extend the first wireless communication link between a first device and a second device.

Still other example methods disclosed herein to extend wireless signal coverage (e.g., which may be implemented by a disclosed example device client) include reporting, to a drone controller, a status of a wireless communication link being received at a first device (e.g., a wireless device, such as a smartphone, a portable computer, a tablet, etc.) from a second device (e.g., a network access point, such as a wireless router, a base station, etc.). Such disclosed example methods also include receiving, from the drone controller, a first message requesting authorization to deploy a drone equipped with a signal extender capable of extending the wireless communication link. Such disclosed example methods further include sending, to the drone controller, a second message authorizing deployment of the drone.

Some such disclosed example methods also include determining whether to send the second message authorizing the deployment of the drone based on stored configuration information.

Additionally or alternatively, some such disclosed example methods further include displaying a prompt for a user input indicating whether the deployment of the drone is authorized. In some such disclosed examples, the sending of the second message occurs in response to detecting the user input and determining the user input authorizes the deployment of the drone.

Additionally or alternatively, in some such disclosed examples, the reported status includes a received signal strength associated with the wireless communication link.

Additionally or alternatively, some such disclosed example methods further include receiving, from the drone, a third message indicating extension of the wireless communication link has been activated and, in response to receiving the third message, displaying a first notification indicating the wireless communication link is being extended. Some such disclosed example methods further include receiving, from the drone, a fourth message indicating extension of the wireless communication link has been deactivated and, in response to receiving the fourth message, displaying a second notification indicating the wireless communication link is no longer being extended.

These and other example methods, apparatus, systems and articles of manufacture (e.g., physical storage media) to extend wireless signal coverage with drones are disclosed in further detail below.

As noted above, prior approaches for improving weak and/or loss-of-signal conditions experienced by wireless devices typically utilize signal extenders (e.g., such as repeaters, boosters, etc.) positioned at fixed locations to repeat or otherwise enhance average wireless signal quality at those fixed locations. However, such fixed repeaters are unable to adapt as the locations of the weak and/or loss-of-signal conditions change, and/or the wireless devices move to different locations. Unlike such prior approaches, example methods, apparatus, systems and articles of manufacture (e.g., physical storage media) disclosed herein provide technical solutions to the technical problems associated with weak and/or loss-of-signal conditions by utilizing drones, such as unmanned aerial vehicles (UAVs) equipped with one or more wireless signal extenders (e.g., which may be implemented by any number, type(s) and/or combination(s) of integrated and/or attachable signal extenders, repeaters, boosters, etc.), to extend wireless signal coverage in wireless communication networks. For example, drone-based wireless signal extension solutions disclosed in further detail below can be used to implement new "follow-me" service models, which allow end users and/or wireless devices to dispatch one or more drones as wireless signal boosters or extenders on an as-needed basis, and or which allow service provider (e.g., mobile carriers, such as AT&T®) to dispatch one or more drones as wireless signal boosters or extenders on behalf of one or more end users/devices on an as-needed basis.

In some disclosed example drone-based wireless signal extension solutions, multiple drones cooperate as primary and backup drones to extend wireless signal coverage for a particular wireless connection at a particular location. For example, a first (e.g., primary) drone may fly to an appropriately chosen location to extend wireless signal connectivity using its signal extender, while a second (e.g., backup) drone is held in reserve until it is instructed to fly to relieve the first drone at an proper time (e.g., to allow the first drone to fly back to a docking station for recharging). Additionally or alternatively, in some disclosed example solutions, multiple drones (e.g., two or more drones) cooperate in relay to further extend signal range/distance. Additionally or alternatively, in some disclosed example solutions, drones can be equipped with signal extenders capable of supporting one or multiple connection modes depending on the operating modes of the wireless devices being supported. For example, a drone may be equipped with a signal extender capable of communicating to a home gateway as a WiFi signal extender, to a femtocell/base station as a 3G/4G signal extender, etc., or any combination thereof.

Turning to the figures, an example wireless signal extension system 100 employing drones as signal extenders in accordance with the teachings of this disclosure is illustrated in FIG. 1. The example wireless signal extension system 100 of the illustrated example includes one or more example signal extender drones 105A-C, which further include respective example drone transport units 110A-C adapted to carry one or more respective example signal extenders 115A-C. Respective ones of the example drone transport units 110A-C may be implemented by, for example, any type of drone flight unit, such as an unmanned aerial vehicle (UAV), etc., and/or other vehicular device, such as an unmanned vehicular device, a robotic device, etc., that is a ground vehicle, a water craft, etc. Respective ones of the example signal extenders 115A-C may be implemented by any number and/or type(s) of signal extenders, signal repeaters, signal boosters, etc., capable of extending wireless communication links corresponding to any type of wireless network, such as, but not limited to, a WiFi local area network (LAN), a carrier network (e.g., a 3G network, a 4G network, etc.), etc. For example, the signal extenders 115A-C may be single-mode extenders capable of extending wireless communication links in one type of wireless network, or multi-mode extenders capable of extending wireless communication links in multiple different types of networks, or a combination thereof. In some examples, one or more of the signal extenders 115A-C are integrated in their respective drone transport units 110A-C. In some examples, one or more of the signal extenders 115A-C are detachably coupled to (e.g., carried by) their respective drone transport units 110A-C.

The example wireless signal extension system 100 of FIG. 1 also includes example docking stations 120A-C for the example signal extender drones 105A-C. The example docking stations 120A-C are structured to recharge and/or otherwise support the signal extender drones 105A-C (and/or their respective drone transport units 110A-C when their respective signal extenders 115A-C are detached).

The example wireless signal extension system 100 of FIG. 1 further includes an example drone controller 125 to configure and control operation of the signal extender drone(s) 105A-C, and receive data from the signal extender drone(s) 105A-C. In the illustrated example, the drone controller 125 communicates with the signal extender drone(s) 105A-C wirelessly via any number and/or type(s) of wireless networks, links, etc., such as a WiFi LAN, a 3G/4G carrier network, a radio link, etc. In some examples, the drone controller 125 includes an access point, such as an internal WiFi access point, to facilitate communication with the signal extender drone(s) 105A-C. In some examples, the drone controller 125 is communicatively coupled to, or otherwise in communication with, an access point, such as an external WiFi access point, permitting communication with the signal extender drone(s) 105A-C.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the drone controller 125 communicates instruction messages to the signal extender drone(s) 105A-C to, for example, deploy the drones, specify target location to which the drones are to navigate, navigate the drones, active/deactivate the drones' signal extenders 115A-C, perform signal extension handoffs, etc. In some examples, the drone controller 125 also receives reporting/status messages from the signal extender drone(s) 105A-C, such as power source status (e.g., battery status, fuel cell status, propellant status, etc.), communication link signal quality, etc., which the drone controller 125 uses to further control operation of the drones. In some examples, the drone controller 125 may be accessed locally (e.g., via a computing device, workstations, etc., communicatively coupled to the drone controller 125) and/or remotely (e.g., via a user interface application, such as a web browser, etc., of a remote device) to configure system operation.

In some examples, the wireless signal extension system 100 includes one or more example device clients 130A-B executed by or otherwise implemented by one or more example wireless devices 135A-B for which a wireless signal extension service is to be provided. For example, the device clients 130A-B can be downloaded to and executed by the wireless devices 135A-B to communicate information from the wireless devices 135A-B to the drone controller 125 and/or the signal extender drone(s) 105A-C to support operation of the drone(s) to provide respective signal extension services to the wireless devices 135A-B. However, as illustrated in the example of FIG. 1, the wireless signal extension system 100 can provide wireless signal extension service to one or more wireless devices, such as an example wireless device 140, not including an associated device client. The example wireless devices 135A-B and 140 can be implemented by any number and/or type(s) of wireless devices, such as mobile phones, smartphones, personal computers (e.g., notebook computers, laptop computers, etc.), electronic tablets, personal digital assistants, gaming devices, etc.

As mentioned above, the drone controller 125 may be accessed locally and/or remotely to configure system operation. For example, a user interface application, such as a web browser, may be used by a device (e.g., one or the wireless device 135A-B and 140 or a different device) to permit a user (e.g., an administrator) to access the drone controller 125 to perform initial set-up and configuration of the signal extender drone(s) 105A-C. In some examples, the drone controller 125 can be accessed to input configuration information specifying the type or types of wireless signals capable of being extended by the different signal extender drone(s) 105A-C. For example, the drone controller 125 may be accessed to specify that the example signal extender drone 105A drone can extend WiFi signals associated with a home gateway, 3G and/or 4G signals associated with a femtocell, etc. Additionally or alternatively, in some examples, the drone controller 125 can be accessed to specify configuration information associating (e.g., assigning) ones of the signal extender drone(s) 105A-C with particular ones of the wireless devices 135A-B and/or 140 for which wireless signal extension service is to be provided. For example, the drone controller 125 may be accessed to specify that the signal extender drone 105B is to support the wireless devices 135B and 140, but not the wireless device 135A.

Additionally or alternatively, in some examples, the drone controller 125 can be accessed to specify configuration information specifying whether respective ones of the signal extender drone(s) 105A-C can be deployed automatically or are to be deployed based on a manual trigger. Such deployment type configuration information can be generalized for a particular signal extender drone 105A-C such that it applies to all wireless devices supported by that drone, or may be particularized such that different deployment type configuration information can be specified for different ones of the wireless devices 135A-B and/or 140. For example, the drone controller 125 may be accessed to specify that the example signal extender drone 105A is to operate in a call-to-fly mode for all supported wireless devices, or for a particular supported wireless device, in which the drone controller 125 waits for authorization from a wireless device before deploying the drone 105A to provide wireless signal extension service for that device. In another example, the drone controller 125 may be accessed to specify that the example signal extender drone 105B is to operate in an auto-fly-to-rescue mode for all supported wireless devices, or for a particular supported wireless device, in which the drone controller 125 automatically deploys the drone 105B to provide signal extension service for a particular supported wireless device when a trigger condition for that wireless device is met.

In some examples, the drone controller 125 can be accessed to allow a user (e.g., an administrator) to select or otherwise configure policy rules for drone operation, such as rules that specify under what conditions a drone is permitted to be deployed automatically, versus under what conditions drone deployment is to be authorized manually (e.g., by a user of the wireless device 135A-B or 140 for which wireless signal extension service is to be provided) Additionally or alternatively, policy rules may be selected or otherwise configured to specify priorities for device, users, services, applications, etc., in various scenarios, including complex conditional rules that the user can select from menus, templates, etc. Examples of such priorities are described in further detail below.

After initial setup is complete, the drone controller 125 of the illustrated example operates one or more of the signal extender drone(s) 105A-C to provide signal extension service in the example system 100 under one or many different possible operating scenarios. Examples of different signal extension service scenarios capable of being supported by the example wireless signal extension system 100 are illustrated in FIGS. 2-6. However, other signal extension service scenarios are also capable of being supported by the wireless signal extension system 100 in accordance with the teaching of this disclosure.

Figure 2:
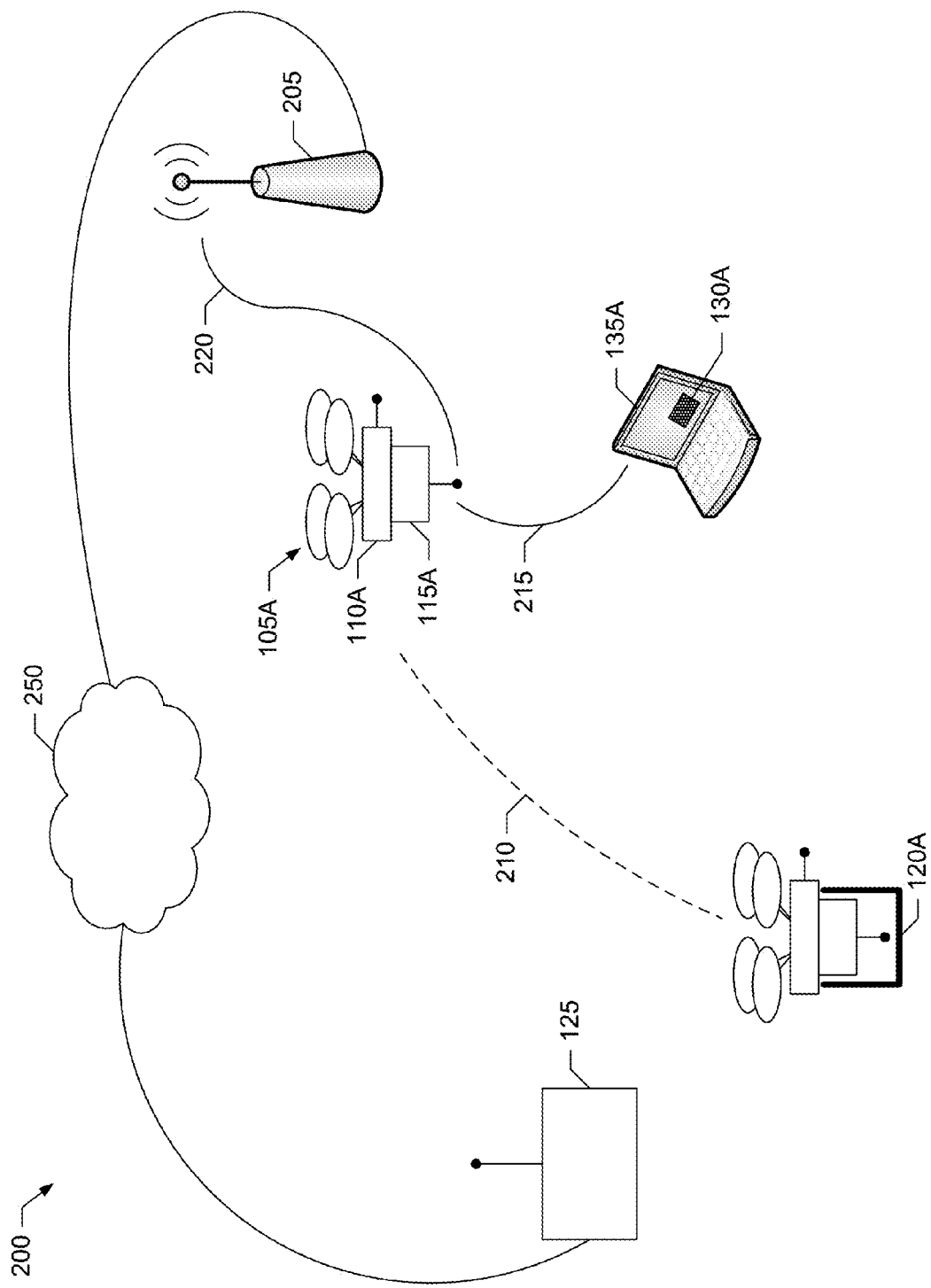
FIGS. 2-6 illustrate example wireless signal extension scenarios capable of being supported by the example wireless signal extension system of FIG. 1.

In the example scenario 200 of FIG. 2, the drone controller 125 receives status information for a wireless communication link being received by the example wireless device 135A from an example access point 205 (e.g., which may be a WiFi access point, a 3G/4G femtocell, carrier base station, etc.). For example, the drone controller 125 may receive such status information from the wireless device 135A (e.g., automatically via the example client 130A, entered by a user via the client 130A, etc.) via a wireless connection with the device 135A, via an example network 250 (e.g., such as the Internet, a broadband network, etc.) in communication with the access point 205 and the drone controller 125, etc., or any combination thereof. Additionally or alternatively, the drone controller 125 may receive such status information from the access point 205, from one or more other sensors, etc. The drone controller 125 then evaluates the status information to determine whether a wireless extension service should be invoked for the wireless device 135A. For example, the drone controller 125 may indicate to the user via messaging sent to the client 130A of the wireless device 135A (e.g., via a wireless connection, via the example network 250, etc.) that wireless signal extension is recommended, and/or may automatically deploy one or more drones, such as the example signal extender drone 105A, to provide signal extension service to the device.

In the example scenario 200, the drone controller 125 deploys the signal extender drone 105A (represented by the dotted line 210) automatically or after receiving authorization manually from the user (e.g., via the client 130A executing on the wireless device 135A). For example, if the auto-fly option is set for the signal extender drone 105A and the wireless device 135A, when the wireless device 135A moves to a location where a measured signal quality of the wireless communication link reaches an unacceptable threshold level (e.g., as reported to the drone controller 125), the wireless device 135A reports the status of the communication link (e.g., the measured signal quality) and its location. In the illustrated example, the drone controller 125 is configured with the location of the access point 205 during the initial setup. In response to determining the reported communication link status (e.g., measured signal quality) meets the trigger condition (e.g., reaches an unacceptable threshold level), the drone controller 125 deploys the signal extender drone 105A (e.g., including both the drone transport unit 110A and signal extender 115A) automatically. In the illustrated example, the drone controller 125 determines, using any appropriate location determination technique, an initial target location for the signal extender drone 105A to be intermediate the location of the wireless device 135A and the access point 205. The drone controller 125 then deploys the signal extender drone 105A by instructing the drone to navigate to the initial target location (e.g., based on map coordinates/waypoints determined by the drone controller 125, automatically via on-board global positioning system (GPS) and/or other sensors, etc., or any combination thereof.) When the initial target location is reached, the signal extender drone 105A activates its signal extender 115A to initiate signal extension service. At this point, the wireless communication link will be relayed between the wireless device 135A and the access point 205 via the signal extender drone 105A (represented by the example signals 215 and 220 in FIG. 2).

In the example scenario 200 of FIG. 2, as the wireless device 135A moves to another location, or moves about its current location, the signal extender drone 105A moves accordingly to maintain the wireless communication link at an acceptable signal level/quality. In some examples, the signal extender drone 105A may utilize various signal strength/quality calculations itself, and/or may rely on the drone controller 125, to adjust its position to be appropriately in between the wireless device 135A and the access point 205. For example, the signal extender drone 105A may measure a first signal strength for the wireless signal 215 received from the wireless device 135A and a second signal strength for the wireless signal 220 received from the access point 205. The signal extender drone 105A may then determine position adjustments autonomously to maintain the measured signal strengths at acceptable levels. Additionally or alternatively, the signal extender drone 105A may report the signal strength measurements to the drone controller 125, which determines the appropriate position adjustments. In the latter case, the drone controller 125 sends position adjustment commands back to the signal extender drone 105A to cause the drone to maintain the wireless signals 215 and 220 at acceptable levels.

Figure 3:
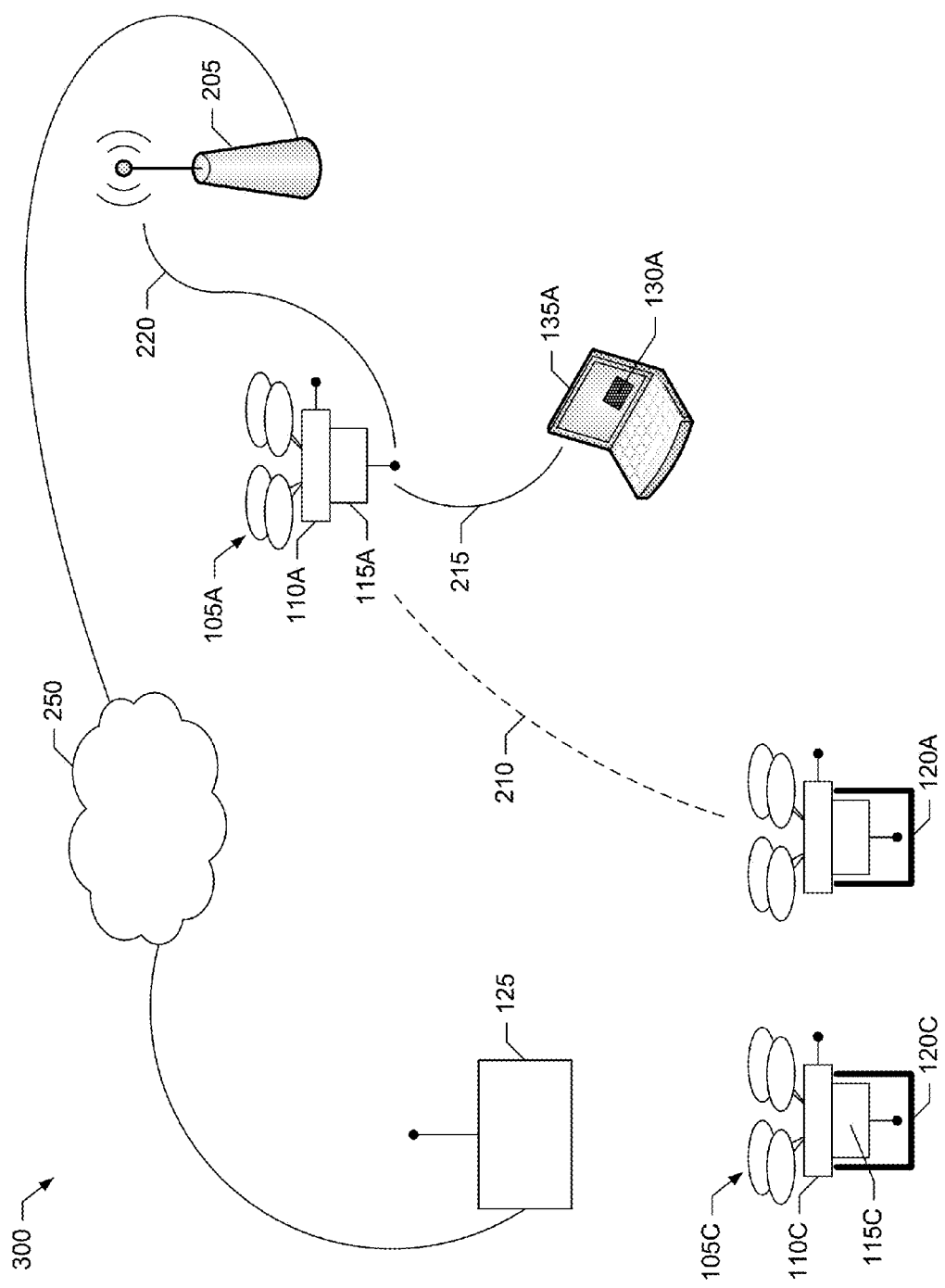

In the example scenario 300 of FIG. 3, the example drone controller 125 augments the example scenario 200 of FIG. 2 by operating the pair of example signal extender drones 105A and 105C as primary and backup drones to provide wireless signal extension service for the example wireless device 135A over an extended period of time. In the illustrated example scenario 300 of FIG. 3, the drone controller 125 operates the signal extender drone 105A as the initial, or primary, drone to provide wireless signal extension service for the example wireless device 135A. In the illustrated example, the signal extender drone 105A reports the status of its source status (e.g., battery status, fuel cell status, propellant status, etc.) to the drone controller 125. For example, if the signal extender drone 105A is powered by a battery, the signal extender drone 105A may report its battery status at regular intervals, when a low battery condition is detected, etc., or any combination thereof. In some examples, the drone controller 125 determines the low battery condition by computing a minimum amount of battery power required by the signal extender drone 105A to return to its docking station 120A, and determines that a low battery condition is met when the drone's reported battery power falls to be within a threshold above this minimum amount (e.g., to provide a battery reserve in the event the drone 105A ends up needing more than the calculated amount of power to return to its docking station 120A). Similar reporting and computations can be performed by/for drones powered by power sources (e.g., fuel cells, propellant, etc.) other than, or in addition to, batteries.

When a low battery condition (or, more generally, a low power condition) is detected/reported for the primary signal extender drone 105A, the drone controller 125 deploys (e.g., by sending one or more commands) the signal extender drone 105C as a backup drone to relieve the primary signal extender drone 105A. The backup signal extender drone 105C then navigates to the location of the primary signal extender drone 105A (e.g., based on map coordinates/waypoints determined by the drone controller 125, automatically via on-board GPS and/or other sensors, etc., or any combination thereof.)

In the example scenario 300, after the backup signal extender drone 105C arrives on station, the drone controller 125 instructs the primary signal extender drone 105A to handoff its wireless extension service duties to the backup signal extender drone 105C. If the backup signal extender drone 105C is equipped with its own signal extender 115C, the drone controller 125 may instruct the primary and backup drones to perform an electronic handoff of the wireless extension service from the signal extender 115A of the drone 105A to the signal extender 115C of the drone 105C. However, if the signal extender 115A of the signal extender drone 105A is a detachable signal extender unit, the signal extender drone 105A may travel to the primary drone's location without any signal extender (e.g., with just its transport unit 110C). In such examples, after the backup signal extender drone 105C arrives on station, the drone controller 125 may issue instructions to the primary and secondary drones 105A-C to mechanically transfer the signal extender 115A from the primary drone 105A to the backup drone 105C. After the handoff (e.g., electronic or mechanical) completes, the drone controller 125 instructs the primary signal extender drone 105A to return back to its docking station 120A to recharge, refuel, etc., while the backup signal extender drone 105C maintains signal extension service for the wireless device 135A.

In some examples, the handoff of signal extension service from the primary signal extender drone 105A to the backup signal extender drone 105C is seamless to the wireless device 135A and, thus, service appears continuous to a device user. However, in some examples, the primary signal extender drone 105A and/or the backup signal extender drone 105C send messages to the device client 130A of the wireless device 135A to indicate when wireless extensions service is being activated and/or deactivated. For example, when the primary signal extender drone 105A initially activates its signal extender 115A, the primary signal extender drone 105A can also send a message to the device client 130A of the wireless device 135A to indicate that signal extension of the device's wireless communication link with the access point 205 is being extended. Later, when the primary signal extender drone 105A deactivates its signal extender 115A (e.g., when extension service is no longer needed, or after a handoff to the backup signal extender drone 105C, etc.), the primary signal extender drone 105A can also send a subsequent message to the device client 130A of the wireless device 135A to indicate that device's wireless communication link with the access point 205 is no longer being extended, or extension is being handed-off to another drone, etc. In the latter case, the backup signal extender drone 105C, in some examples, can send further messaging to the device client 130A of the wireless device 135A to indicate when the backup drone 105C has resumed providing signal extension service for the wireless device 135A. In some examples, such messaging may be performed automatically, or may be performed depending on the user-set preferences at the drone controller 125.

Figure 4:
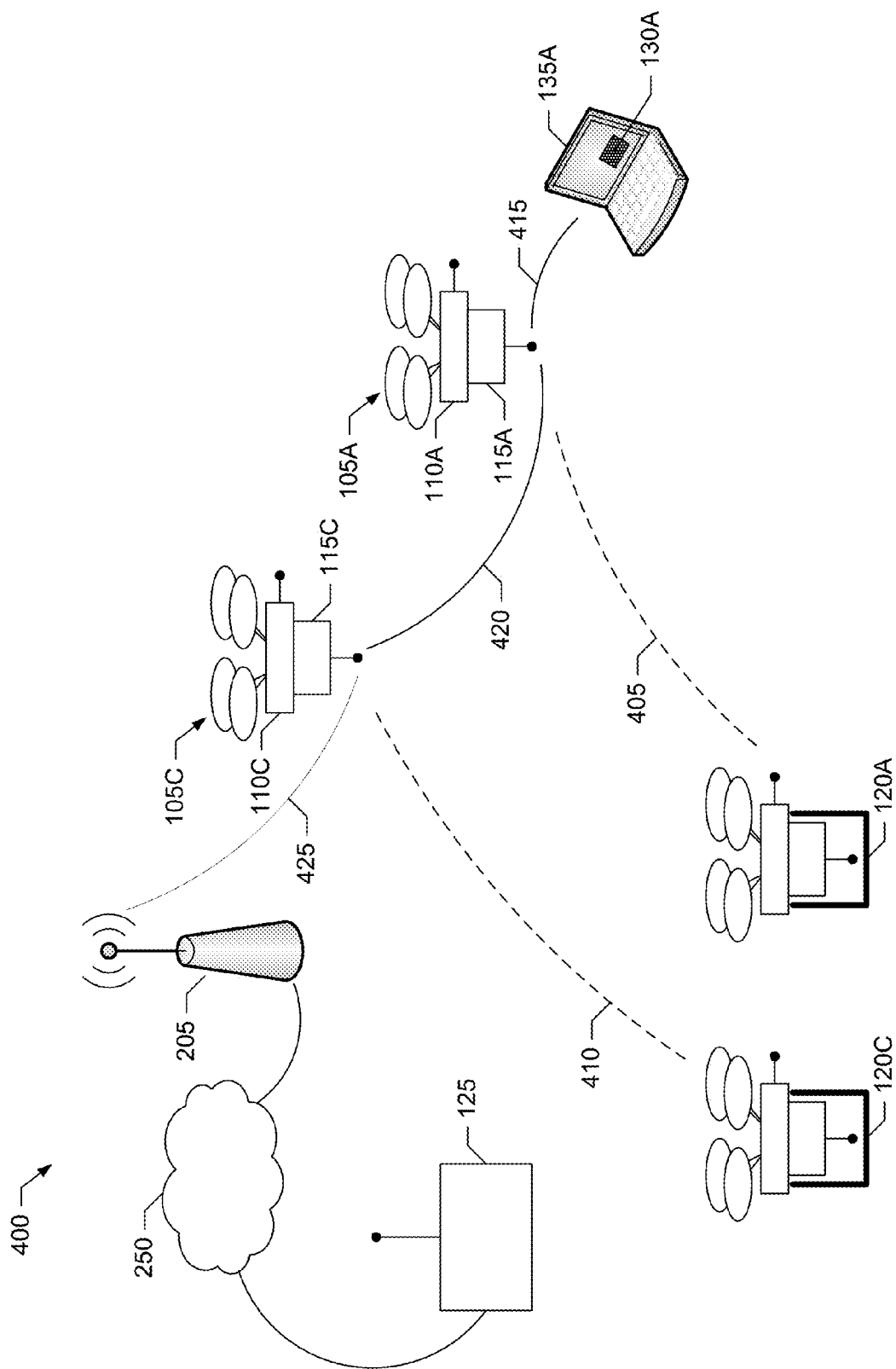

In the example scenario 400 of FIG. 4, the example drone controller 125 operates the pair of example signal extender drones 105A and 105C in a chain relay mode to increase a range of the wireless signal extension service provided for the example wireless device 135A. In the illustrated example scenario 400 of FIG. 4, the drone controller 125 determines (e.g., based on stored configuration information) that the distance between the wireless device 135A and the access point 205 exceeds a signal extension range of the signal extender drone 105A. To still be able to provide extension service for the wireless device 135A, the drone controller 125 deploys multiple drones, such as the signal extender drones 105A and 105C, each equipped with respective signal extenders 115A and 115C capable of extending the communication link between the wireless device 135A and the access point 205. In some such examples, the drone controller 125 determines a first target location for the first signal extender drone 105A to cause the location of the wireless device 135A (e.g., ascertained from positional data received by the drone controller 125 from the device 135A via a wireless connection, via the example network 250, etc.,) to be within the signal extension range of the first signal extender drone 105A. The drone controller 125 also determines a second target location for the second signal extender drone 105A that is intermediate between the first target location and the location of the access point 205 (e.g., ascertained from stored configuration data), such that both the first target location and the location of the access point are within the signal extension range of the second signal extender drone 105C. (In some examples, the drone controller 125 deploys further signal extender drones to add to the chain relay to be formed by the drones 105A and 105C if the distance between the first target location and the location of the access point 205 exceeds the signal extension range of the second signal extender drone 105C). The drone controller then deploys the first signal extender drone 105A to the first target location (represented by the dotted line 405) and deploys the second signal extender drone 105C to the second target location (represented by the dotted line 410). Upon being deployed, while navigating to their destinations, or after they reach their respective target locations, the signal extender drones 105A and 105C activate their respective signal extenders 115A and 115C. The signal extender drones 105A and 105C then provide signal extension service for the wireless device 135A by the first signal extender drone 105A relaying the communication link between the wireless device 135A and the second signal extender drone 105C (represented by the signals 415 and 420), and the second signal extender drone 105C relaying the communication link between the access point 205 and the first signal extender drone 105A (represented by the signals 420 and 425).

In some examples, the example drone controller 125 implements the chain relay mode of the example scenario 400 after the first signal extender drone 105A has already been deployed to provide signal extension service for the wireless device 130A. For example, while providing signal extension service, the first signal extender drone 105A may monitor the status (e.g., signal strength, quality, etc.) of the signals received from the wireless device 130A and the access point 205. If the monitored status meets a trigger condition (e.g., falls below a threshold), the first signal extender drone 105A may send a message to report this condition to the drone controller 125. In response to this message, the drone controller 125 may perform the processing described above to move the first signal extender drone 105A to a first target location such that the location of the wireless device 130A is within the signal extension range of the drone 105A, and deploy the second signal extender drone 105C to a second target location that is intermediate between the first target location and the location of the access point 205. In some examples, after the signal extender drones 105A and 105C arrive at their respective target locations, the drone controller 125 instructs the signal extender drone 105A to establish a communication link with the signal extender drone 105C, which establishes a communication link with the access point 205 to provide chain relay signal extensions service for the wireless device 135A.

Figure 5:
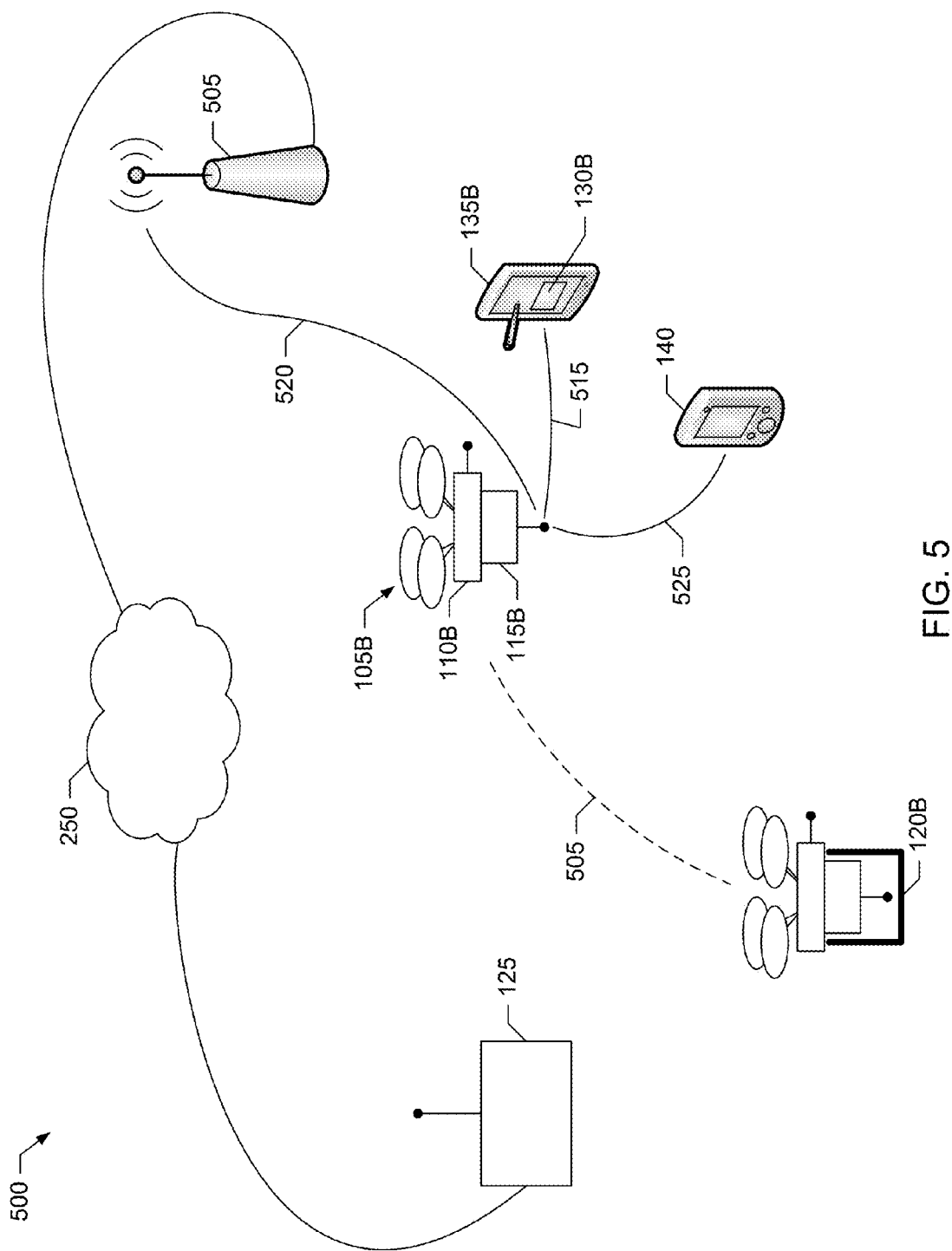

In the example scenario 500 of FIG. 5, the example drone controller 125 operates the example signal extender drone 105B to provide signal extension service in an area with multiple wireless devices, such as the example wireless devices 135B and 140, in communication with an access point, such as an example access point 505. For example, the drone controller 125 may deploy the signal extender drone 105B (represented by the dotted line 510) to provide signal extension service for the wireless device 135B (represented by the signals 515 and 520). Sometime thereafter, the drone controller 125 of the illustrated example determines that signal extension service for a communication link between the wireless device 140 and the access point 505 is desired (e.g., based on a device/user request, reported link status, etc., received via a wireless connection, received via the example network 250, which is in communication with the drone controller 125 and the access point 505 in the illustrated example, etc.). If the signal extender 115B of the signal extender drone 105B can support multiple devices, the drone controller 125 may instruct the signal extender drone 105B to begin relaying the communication link between the wireless device 140 and the access point 505 (represented by the signal 525). In some such examples, the drone controller 125 evaluates the locations of the access point 505 (e.g., based on stored configuration data), the locations of the wireless devices 135B and 140 (e.g., based on reported positioning data) and reported signal qualities for communication links being received by the wireless devices 135B and 140 to determine an adjusted location of the signal extender drone 105B to maintain acceptable signal quality for both the wireless devices 135B and 140. The drone controller 125 may then instruct the signal extender drone 105B to move to the adjusted location to provide signal extension service for both the wireless devices 135B and 140. In some such examples, the signal extender drone 105B continues to monitor signals being received from the wireless devices 135B and 140 and the access point 505, and adjusts its position appropriately to maintain acceptable signal quality for the connections being extended.

However, if the signal extender 115B of the signal extender drone 105B does not support multiple devices, or otherwise does not have capacity to provide signal extension service to the wireless device 140 along with the wireless device 135B and any other devices being supported, the drone controller 125 may evaluate one or more policy rules to determine how to proceed. For example, the policy rules (e.g., configured at the drone controller 125 during initial setup and/or configured/updated thereafter) may specify different priorities for the different wireless devices 135B and 140. In some examples, such priorities may be dependent on other factors in addition to the identities of the wireless devices 135B and 140 (and/or the identities of the users of the wireless devices 135B and 140). For example, such priorities may vary depending on the time of day, the locations of the wireless devices 135B and 140, the application(s) executing on the wireless devices 135B and 140, etc. In some such examples, the drone controller 125 evaluates the policy rule(s) to determine whether the wireless device 140 has higher priority than the wireless device 135B

(e.g., based on the identities of the wireless devices 135B and/or 140, the identities of the device users, the time of day, the respective application(s) executing on the devices, etc.). If the wireless device 140 is determined to have higher priority than the wireless device 135B, the drone controller 125 may instruct the signal extender drone 105B to halt (e.g., deactivate) signal extension service for the wireless device 135 and activate signal extension service for the wireless device 140. Conversely, if the wireless device 135B is determined to have higher priority than the wireless device 140, the drone controller 125 may cause the signal extender drone 105B to maintain signal extension service for the wireless device 135B and not provide signal extension service for the wireless device 140 (e.g., by sending appropriate instructions, or by taking no action to cause the status quo to be maintained). If both wireless devices 135B and 140 are determined to have the same priority, then drone controller 125 may employ any appropriate tie-breaking procedure to determine whether to cause the signal extender drone 105B to maintain signal extension service for the wireless device 135B, or switch to providing signal extension service for the wireless device 140.

In some examples, the wireless devices 135B and 140 may be positioned relative to the access point 505 such that signal extension range of the signal extender 115B of signal extender drone 105B is insufficient to support extending the communication links between the access point 505 and the respective wireless devices 135B and 140. In some such examples, the drone controller 125 may similarly evaluate the policy rule(s) to determine whether the wireless device 140 has higher priority than the wireless device 135B (e.g., based on the identities of the wireless devices 135B and/or 140, the identities of the device users, the time of day, the respective application(s) executing on the devices, etc.). If the wireless device 140 is determined to have higher priority than the wireless device 135B, the drone controller 125 may instruct the signal extender drone 105B to halt (e.g., deactivate) signal extension service for the wireless device 135 and redeploy to a new location (e.g., determined based on the locations of the wireless device 140 and the access point 505) and activate signal extension service for the wireless device 140. Conversely, if the wireless device 135B is determined to have higher priority than the wireless device 140, the drone controller 125 may cause the signal extender drone 105B to maintain signal extension service for the wireless device 135B and not redeploy to provide signal extension service for the wireless device 140 (e.g., by sending appropriate instructions, or by taking no action to cause the status quo to be maintained). If both wireless devices 135B and 140 are determined to have the same priority, then drone controller 125 may employ any appropriate tie-breaking procedure to determine whether to cause the signal extender drone 105B to maintain signal extension service for the wireless device 135B, or redeploy to provide signal extension service for the wireless device 140.

Figure 6:
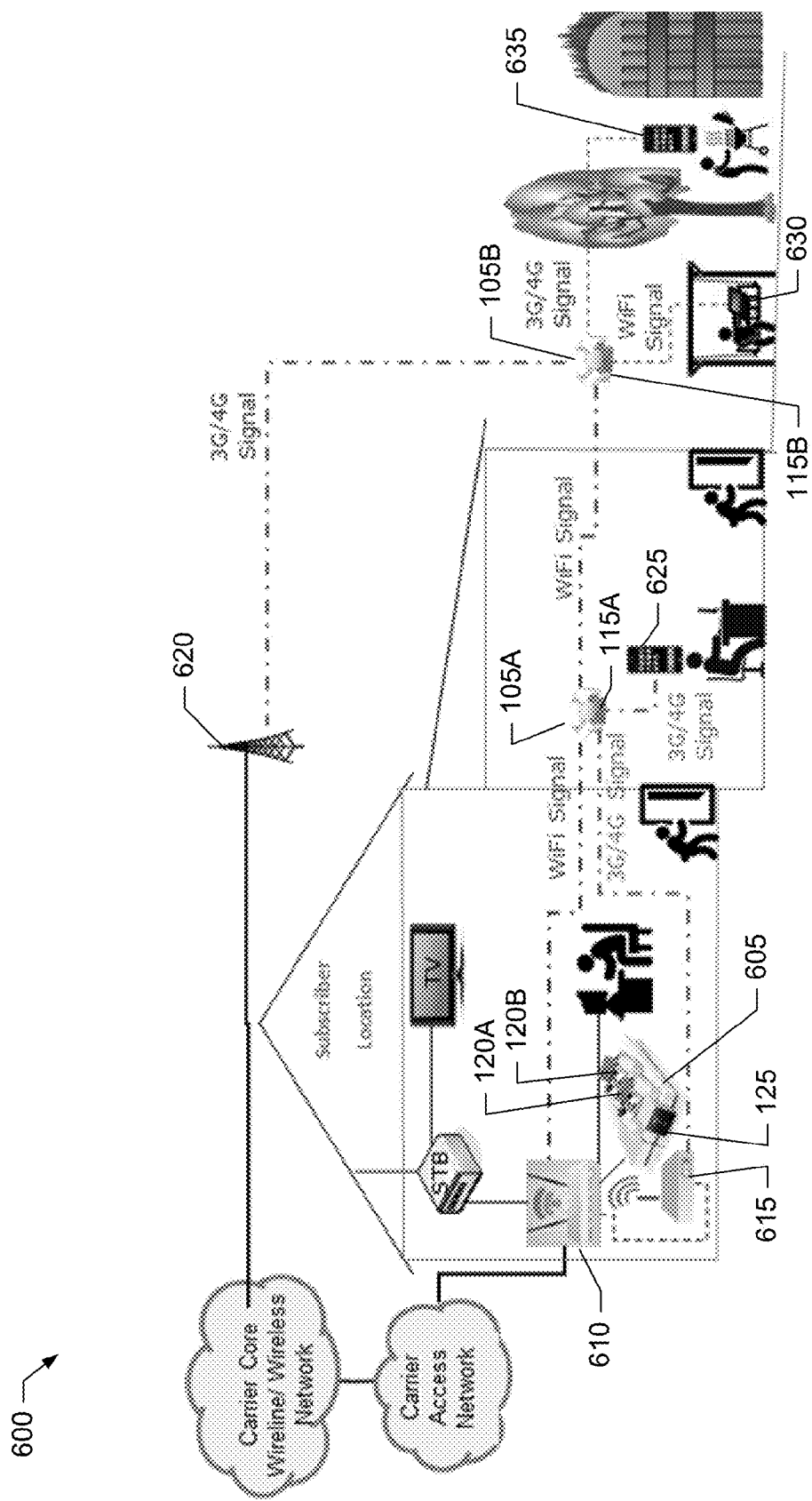

In the example scenario 600 of FIG. 6, the example drone controller 125 controls multiple signal extender drones 105A-B to implement combinations of the example scenarios 200-500. In the example scenario 600 of FIG. 6, the drone controller 125 is included in an example dual drone station 605, which also houses the example docking stations 120A and 120B for the example signal extender drones 105A and 105B. Furthermore, in the example scenario 600 of FIG. 6, the signal extenders 115A and 115B of the respective signal extender drones 105A and 105B are multi-mode repeaters capable of extending WiFi communication links terminating at an example WiFi access point 610 (e.g., corresponding to a home gateway, router, etc.), and 3G/4G communication links terminating at example carrier access points 615 and 620 (e.g., such as an example femtocell 615 and an example base station 620 as shown in the illustrated example).

In the example scenario 600 of FIG. 6, the drone controller 125 operates the example signal extender drone 105A in accordance with the example scenario 200 described above to thereby provide 3G/4G signal extension service for an example wireless device 625 (e.g., which may correspond to any wireless device, such as a mobile phone/smartphone as depicted in FIG. 6). In the illustrated example, the drone controller 125 also operates the signal extender drone 105A and the signal extender drone 105B in accordance with a combination of example scenarios 400 and 500 to (i) provide signal extension service for multiple wireless devices, such WiFi extension service for an example wireless device 630 and 3G/4G extension service for an example wireless device 635, at a given location, and (ii) implement a chain relay to provide WiFi signal extension service for the example wireless device 630. The wireless devices 630 and 635 may also correspond to any type(s) of wireless devices, such as an example portable computer 630 and an example mobile phone/smartphone 635 as depicted in FIG. 6. Although not shown, one or more additional signal extender drones, such as the example signal extender drone 105C, could be included in the example scenario 600 of FIG. 6, which the drone controller 125 could operate as a backup drone for the signal extender drone 105A and/or 105C in accordance the example scenario 300 described above.

Although the example wireless signal extension system 100 of FIG. 1 is depicted as including one (1) example drone controller 125, three (3) example signal extender drones 105A-C with associated example docking stations 120A-C, and two (2) example device clients 130A-B, other example implementations of the wireless signal extension system 100 can include any numbers of drone controllers 125, signal extender drones 105A-C and/or device clients 130A-B. Moreover, in addition or as an alternative to the example scenario 200-600 described above, other combinations of any of the scenarios 200-600, as well as other signal extension operating scenarios and combinations thereof consistent with the teachings of this disclosure, can be supported by the example system 100.

Figure 7:
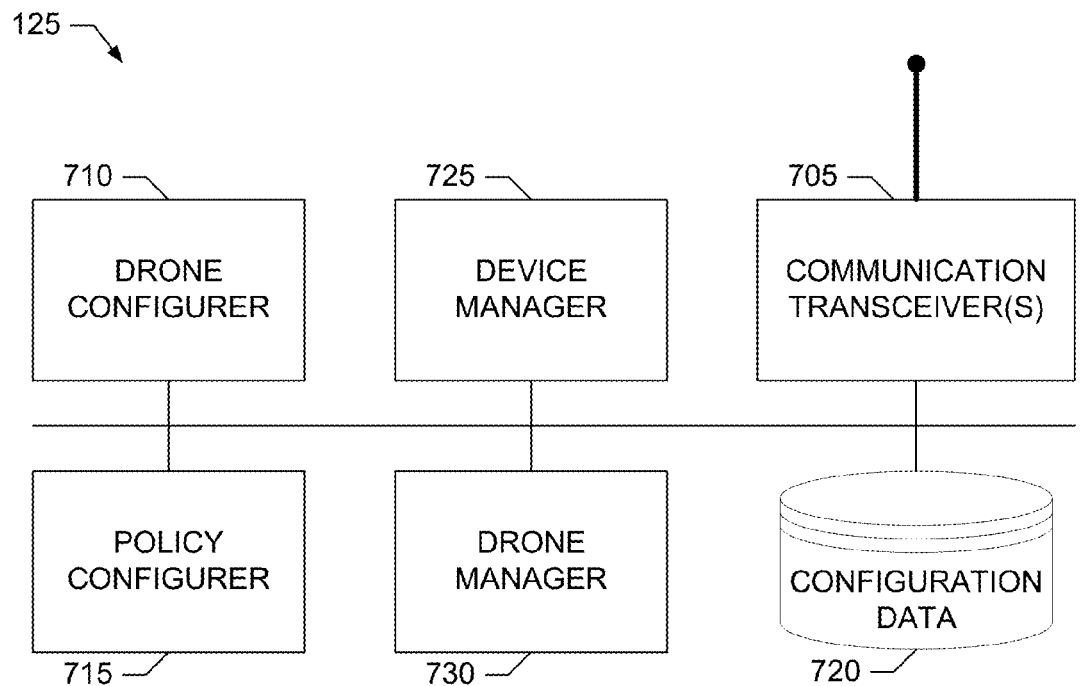
FIG. 7 is a block diagram of an example drone controller that may be used to implement the example wireless signal extension system of FIG. 1.

A block diagram of an example implementation of the drone controller 125 of FIGS. 1-6 is illustrated in FIG. 7. The example drone controller 125 of FIG. 7 includes one or more example communication transceivers 705 structured to communicatively couple with and control one or more drones, such as the example signal extender drones 105A-C, via radio frequency transmission, infrared transmissions, etc. Additionally or alternatively, in some examples, one or more of the example communication transceivers 705 is/are structured to communicatively couple with one or more networks (e.g., WiFi networks, 3G/4G networks, etc.) via which, for example, (i) messages can be exchanged with one or more drones, such as the example signal extender drones 105A-C, to control such drones, (ii) messages can be exchanged with one or more device clients, such as the example device clients 130A-B, to receive status information, request and received drone deployment authorization, etc., (iii) messages can be received to specify configuration information to be stored at the drone controller 125, etc. In some examples, the communication transceiver(s) 705 are implemented by any number and/or type(s) of interface circuits, such as the example interface circuit 1620 of the example processor platform 1600 of FIG. 16, which is described in further detail below.

The example drone controller 125 of FIG. 7 also includes an example drone configurer 710 to specify drone configuration information for the drones, such as the example signal extender drones 105A-C, to be controlled by the drone controller 125. For example, such drone configuration information can specify capabilities, such as range, operating time, signal connection types supported, etc., for respective ones of the signal extender drones 105A-C controlled by the drone controller 125. Additionally or alternatively, such drone configuration information can assign respective ones of the signal extender drones 105A-C to provide signal extension service for specified individual or combinations of wireless devices, such as the example wireless devices 135A-B and/or 140. For example, the drone configuration information received by the drone configurer 710 can specify a drone identifier, drone capabilities to be associated a particular drone identifier, and one or wireless device identifiers to be associated with a particular drone identifier. The drone configurer 710 of the illustrated example receives such drone configuration information from a local user interface and/or a remote user interface implemented by a user interface application, such as a web browser, executed by a remote computing device.

The example drone controller 125 of FIG. 7 also includes an example policy configurer 715 to specify policy configuration information for controlling the drones, such as the example signal extender drones 105A-C, under different operating scenarios. For example, such policy configuration information can specify deployment type information indicating whether respective ones of the signal extender drones 105A-C can be deployed automatically or are to be deployed based on a manual trigger. Such deployment type information (e.g., automatic or manual) can apply to all wireless devices supported by a given signal extender drone 105A-C, or can be specified for particular wireless devices supported by a given drone, thereby allowing different deployment options for different supported wireless devices. Additionally or alternatively, such policy configuration information can specify under what conditions a drone is permitted to be deployed automatically, versus under what conditions drone deployment is to be authorized manually. Additionally or alternatively, such policy configuration information can specify priorities for providing wireless extension service for different devices. For example, such priority information may specify a priority level to be associated with a device identifier of a particular device. In some examples, such priority information may be further conditioned on a user identifier associated with a given device, application(s) being executed on a particular device, time-of-day, location, etc. The policy configurer 715 of the illustrated example receives such policy configuration information from a local user interface and/or a remote user interface implemented by a user interface application, such as a web browser, executed by a remote computing device.

To store the drone configuration information obtained by the example drone configurer 710 and/or the policy configuration information obtained by the example policy configurer 715, the example drone controller 125 of FIG. 7 includes example configuration data storage 720. The example configuration data storage 720 may be implemented by any number and/or type(s) of storage devices, memories, etc., or combination thereof. For example, the configuration data storage 720 may be implemented by the example volatile memory 1614 and/or the example mass storage device(s) 1628 of the example processor system 1600 of FIG. 16, which is described in further detail below.

The example drone controller 125 of FIG. 7 includes an example device manager 725 to manage wireless devices, such as the example wireless devices 130A-B and/or 140, for which wireless extension service is to be provided. For example, the device manager 725 receives, via the communication transceiver(s) 705, status information from wireless device(s) for wireless communication link(s) being received by the wireless devices. Such status information may include, for example, signal strength information, an indication that the communication link no longer meets an acceptable quality threshold, etc. In some examples, the device manager 725 receives, via the communication transceiver(s) 705 and from wireless device(s) for which wireless extension service is to be provided, position information (e.g., such as GPS coordinates) specifying the location(s) of the wireless device(s). In some examples, the device manager 725 queries a wireless device for which wireless extension service is to be provided to request and receive authorization to deploy one or more drones, such as the signal extender drone(s) 105A-C. In some examples, the device manager 725 receives information, such as device identifiers, user identifiers for users logged into and operating the wireless devices, application identifiers for applications executing on the wireless devices, etc., from the wireless devices to permit evaluation of one or more specified policy rules for controlling drone operation.

The example drone controller 125 of FIG. 7 includes an example drone manager 730 to manage drones, such as the signal extender drones 105A-C, providing wireless extension service in the example system 100. For example, when the example device manager 725 determines that a link status (e.g., a signal strength, a signal quality etc.) reported from a wireless device for a communication link meets a trigger condition (e.g., falls below a threshold), or the status otherwise indicates that the communication link is unacceptable or extension service is requested, the drone manager 730 determines whether to deploy one or more of the signal extender drone(s) 105A-C to provide signal extension service for the wireless device. In some examples, the drone manager 730 evaluates one or more policy rules based on specified policy configuration information to determine whether a drone should be deployed and, if so, whether automatic or manual deployment is to be performed. If the policy rules permit drone deployment, the drone manager 730 selects, using the specified drone configuration information, one of the available signal extender drones 105A-C based on, for example, the type of the wireless communication link to be extended and an identifier of the wireless device. This latter type of operation is especially beneficial when different ones of the signal extender drones 105A-C may support different types of communication links, and/or different ones of the signal extender drones 105A-C may be assigned to support different ones or groups of wireless devices.

In the illustrated example of FIG. 7, the drone manager 730 also determines an initial target location (or locations) to which a drone (or drones) is (are) to be deployed to provide wireless extension service for a wireless device. For example, the drone manager 730 may use received and/or configured location information for the wireless device and an access point providing the communication link to the wireless device to determining an initial target location for a selected one of the signal extender drones 105A-C that is intermediate the locations of the wireless device and the access point. In some examples, the drone manager 730 further uses signal strength/quality measurements received from the wireless device and/or access point to determine the initial target location to provide acceptable signal levels for the signals being relayed to/from the wireless device and to/from the access point. In some examples, such as the example chain relay scenario 400 described above, the drone manager 730 determines multiple initial target locations for multiple ones of the signal extender drones 105A-C to be deployed to provide signal extension service for the wireless device.

In some examples, the drone manager 730 utilizes any appropriate automated mapping technology to determine map coordinates, waypoints, etc., to transmit to the selected one(s) of the signal extender drones 105A-C that is(are) to provide signal extension service for a given wireless device. The drone manager 730 then deploys the signal extender drone(s) 105A-C, and monitors drone operation (e.g., power source status, operating time, etc.) to determine when to instruct the signal extender drone(s) 105A-C to return to their respective docking station(s). In some examples, the drone manager 730 may redeploy an already-deployed drone to support another wireless device (e.g., having higher priority than a wireless device currently being supported, or when a currently supported wireless device is turned off or otherwise no longer needs a communication link to be extended).

Figure 8:
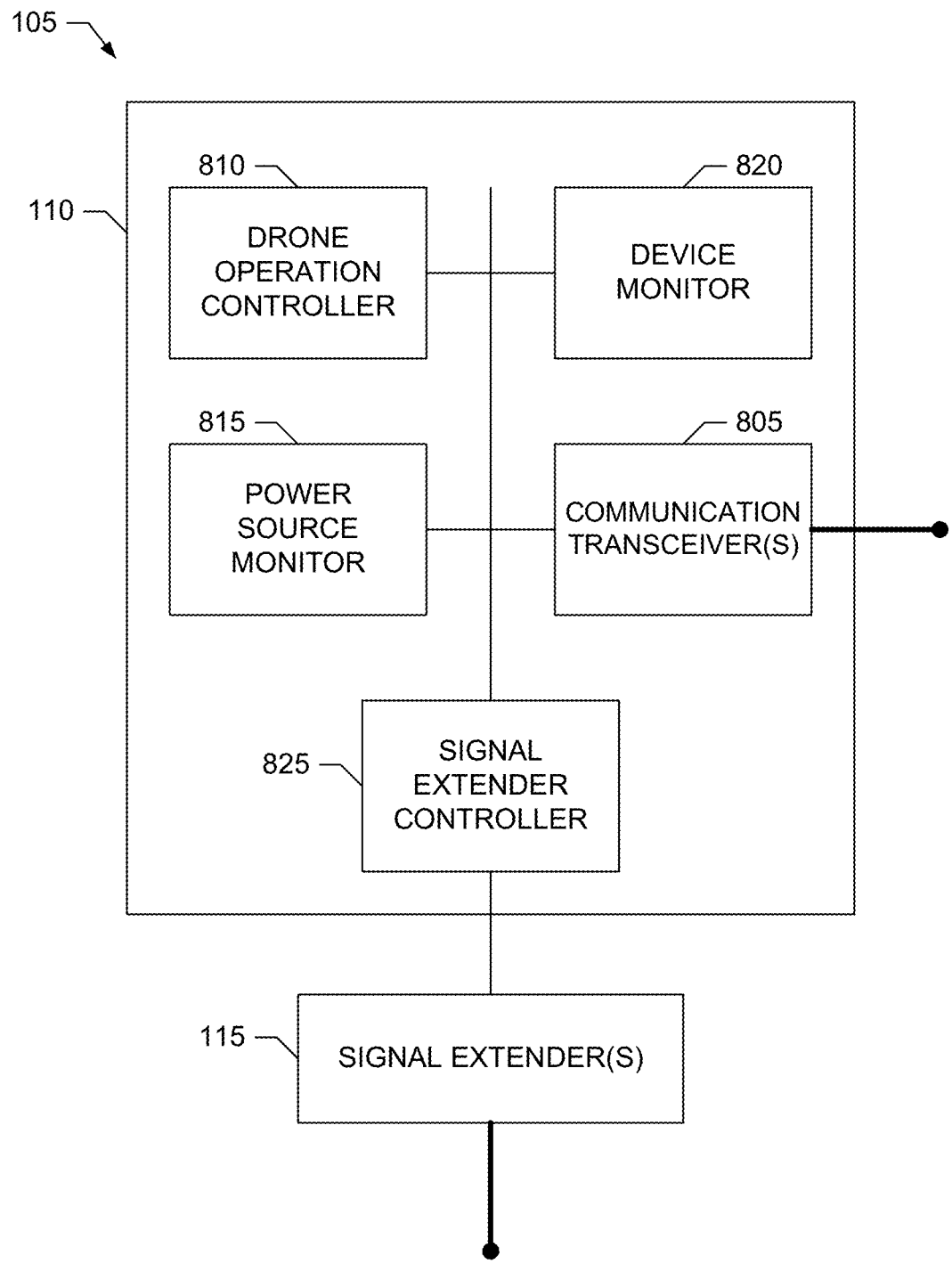
FIG. 8 is a block diagram of an example drone that may be used to implement the example wireless signal extension system of FIG. 1.

A block diagram of an example signal extender drone 105, which may be used to implement one or more of the example signal extender drones 105A-C of FIGS. 1-6, is illustrated in FIG. 8. The example signal extender drone 105 of FIG. 8 includes one or more example communication transceivers 805 structured to communicatively couple with a drone controller, such as the example drone controller 125, via radio frequency transmission, infrared transmissions, etc. Additionally or alternatively, in some examples, one or more of the example communication transceivers 805 is/are structured to communicatively couple with one or more networks (e.g., WiFi networks, 3G/4G networks, etc.) via which, for example, (i) messages can be exchanged with a drone controller, such as the example drone controller 125, to facilitate control of drone 105, (ii) messages can exchanged with one or more device clients, such as the example device clients 130A-B, to receive status information, send notifications, etc. In some examples, the communication transceiver(s) 805 are implemented by any number and/or type(s) of interface circuits, such as the example interface circuit 1720 of the example processor platform 1700 of FIG. 17, which is described in further detail below.

The example signal extender drone 105 also includes an example drone operation controller 810 to control operation of the drone 105. For example, the drone operation controller 810 may receive one or more messages/commands from drone controller, such as the example drone controller 125, to instruct the drone to deploy and navigate to an initial target location. Once the drone 105 arrives at the initial target location, the drone operation controller 810 may also autonomously adjust the position of the drone 105 based on, for example, signal measurements for signals being received by the communication transceiver(s) 805 to maintain acceptable signal quality for the signals being measured. In some examples, the drone operation controller 810 further reports monitored data back to the example drone controller 125. For example, such monitored data may include, but is not limited to, power source (e.g., battery) status data provided by an example power source monitor 815 and/or wireless device status data provided by an example device monitor 820.

For example, the power source monitor 815 may monitor a level of an on-board power source (e.g., a power level of battery or battery pack, fuel cell, etc., a propellant level associated with an engine, etc.) powering the drone 105. In some examples, the battery monitor 815 reports the monitored power source level at regular intervals. Additionally or alternatively, in some examples, when the monitored power source level falls below a threshold, the power source monitor 815 reports a status indicator indicating that a low power condition has occurred.

The example signal extender drone 105 may include the example device monitor 820 to monitor the wireless signal extension service being provided to a particular wireless device. For example, the device monitor 820 may communicate with a device client, such as one of the example device clients 130A-B, executing on the wireless device being supported to receive the communication link status information described above. Additionally or alternatively, the device monitor 820 may receive commands from a device client of the wireless device instructing the drone to, for example, terminate signal extension service, relocate to another position (e.g., that is less obtrusive to a user of the wireless device), etc.

The example signal extender drone 105 further includes an example signal extender controller 825 to control one or more example signal extender(s) 115 integrated in and/or detachably coupled with the drone 105. The example signal extender(s) 115 may correspond to one or more of the example signal extenders 115A-C of FIGS. 1-6. In the illustrated example of FIG. 8, the signal extender controller 825 activates and deactivates the signal extender(s) 115 to provide signal extension service to one or more wireless devices. For example, the signal extender controller 825 may activate the signal extender(s) 115 automatically once the drone 105 arrives at a programmed initial target location, and/or in response to one or more commands received by the drone operation controller 810 from the drone controller 125. Similarly, the signal extender controller 825 may deactivate the signal extender(s) 115 automatically once the drone 105 is instructed to return to its docking station, and/or in response to one or more commands received by the drone operation controller 810 from the drone controller 125. In some examples, the signal extender controller 825 communicates status notifications to the wireless device being supported to indicate, for example, that signal extension service has been enabled when the signal extender(s) 115 have been activated, and/or that signal extension service has been disabled when the signal extender(s) 115 have been deactivated.

In some examples, the communication transceiver(s) 805, the operation controller 810, the power source monitor 815, the device monitor 820 and/or the signal extender controller 825 are included in an example drone transport unit 110 of the example signal extender drone 105. The example drone transport unit 110 may correspond to one or more of the example drone transport units 110A-C of FIGS. 1-6.

Figure 9:
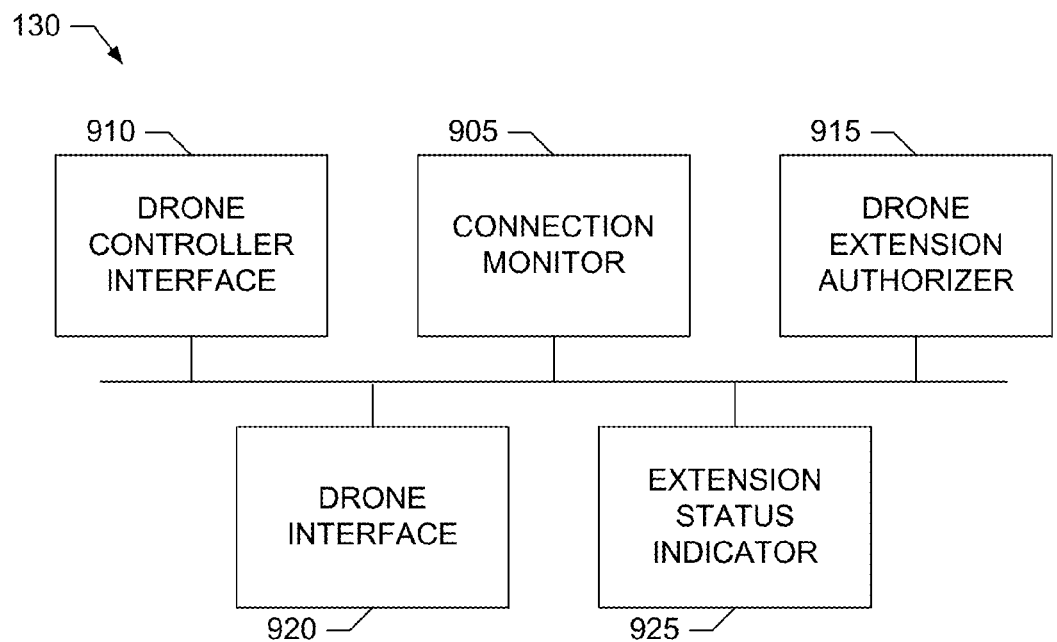
FIG. 9 is a block diagram of an example device client that may be used to implement the example wireless signal extension system of FIG. 1.

A block diagram of an example device client 130, which may be used to implement one or more of the example device clients 130A-B of FIGS. 1-6, is illustrated in FIG. 9. The example device client 130 of FIG. 9 includes an example connection monitor 905 to monitor status of one or more wireless communication links being received by a wireless device, such as one of the wireless devices 135A-B, executing the client 130. The monitored wireless communication links may include, for example, one or more WiFi links, one or more 3G/4G links, etc., received from one or more devices, such as one or more access points (e.g., WiFi access points, femtocells, base stations, etc.), other user equipment (UEs), etc., or any combination thereof. In some examples, the status determined by the example connection monitor 905 for a given communication link includes a measured signal strength of the link (e.g., such as received power, a received signal strength indicator (RSSI), etc.), a measured signal quality of the link (e.g., such as a bit error rate, a frame error rate, etc.), etc. In some examples, the status determined by the example connection monitor 905 includes information indicating whether the monitored status (e.g., measured signal strength, measured signal quality, etc.) meets a trigger condition (e.g., meets or falls below a threshold) for requesting signal extension service from a drone controller, such as the example drone controller 125.

The example device client 130 of FIG. 9 also includes an example drone controller interface 910 to report the monitored status for the received communication link(s) to a drone controller, such as the example drone controller 125. For example, the drone controller interface 910 may utilize a communication transceiver of the wireless device executing the device client 130 to transmit message(s) including communication link status to the drone controller 125 at regular intervals while a communication link is active, upon occurrence of one or more events, (e.g., such as when a trigger condition as described above is met), etc., or any combination thereof. In some examples, the drone controller interface 910 is also structured to receive query messages from a drone controller, such as the drone controller 125, requesting authorization to deploy one or more drones, such as the example signal extender drones 105A-C, to provide signal extension service for the wireless device executing the client 130. In such examples, the drone controller interface 910 is also structured to transmit response messages to the drone controller 125 in response to the query messages to inform the drone controller if deployment of drones is or is not authorized.

The example device client 130 of FIG. 9 further includes an example drone extension authorizer 915 to determine whether to authorize deployment of drones to provide wireless signal extension service for the wireless device executing the client 130. In some examples, the drone extension authorizer 915 receives query messages from the drone controller interface 910 requesting authorization to deploy one or more drones, such as the example signal extender drones 105A-C, to provide signal extension service for the wireless device executing the client 130. In some example, the drone extension authorizer 915 evaluates stored configuration information to automatically determine whether drone deployment is authorized. In some example, the drone extension authorizer 915 presents (e.g., via a user interface of the wireless device executing the client 130) a prompt for a user input indicating whether drone deployment is authorized. In some such examples, the prompt displayed by the drone extension authorizer 915 may include a default response (e.g., authorize or not authorize) specified by stored configuration information, and may provide the user an ability to select the default response or an alternative response. Then, based on evaluating the stored configuration information and/or the user input, the drone extension authorizer 915 determines an appropriate response message (e.g., drone-based signal extension authorized or not authorized) to the received query message, and provides the response message to the drone controller interface 910 for transmission to the drone controller.

In the illustrated example of FIG. 9, the device client 130 includes an example drone interface 920 to communicate with one or more drones, such as the example signal extender drones 105A-C, providing wireless signal extension service for a wireless device executing the client 130. The drone interface 920 of the illustrated example enables the device client 130 to exchange messages with the drone(s) separately from the wireless communication link(s) being extended (e.g., relayed, boosted, etc.) by the drone(s). For example, the drone interface 920 may receive signal extension service status messages from the drones(s) indicating the status (e.g., enabled, disabled, under handoff, etc.) of a signal extension service being provided by the drone(s). Additionally or alternatively, in some examples, the drone interface 920 may send messages to the drone(s) including the communication link status determined by the connection monitor 905. Additionally or alternatively, in some examples, the drone interface 920 may send instructions to the drone(s) to, for example, instruct the drone(s) to re-position to different locations (e.g., such as locations that are less obtrusive to a user of the wireless device executing the client 130.

In the illustrated example of FIG. 9, the device client 130 also includes an example extension status indicator 925 to present signal extension service status notifications received via the drone interface 920 from one or more drones, such as the example signal extender drones 105A-C, providing wireless signal extension service for a wireless device executing the client 130. In some examples, in response to receiving a message from a drone including a notification that wireless signal extension service is enabled, the extension status indicator 925 displays, via a user interface of the wireless device executing the client 130, a notification (e.g., a message, an icon, etc.) to notify a device user that wireless signal extension service is enabled. In some examples, in response to receiving a message from a drone including a notification that wireless signal extension service is disabled, the extension status indicator 925 displays, via the user interface of the wireless device executing the client 130, a notification (e.g., a message, an icon, etc.) to notify the device user that wireless signal extension service is disabled. In some examples, in response to receiving a message from a drone including a notification that wireless signal extension service is undergoing handoff (e.g., from a primary drone to a backup drone), the extension status indicator 925 displays, via the user interface of the wireless device executing the client 130, a notification (e.g., a message, an icon, etc.) to notify the device user that wireless signal extension service is undergoing handoff (e.g., and may be disrupted temporarily).

While example manners of implementing the wireless signal extension system 100 are illustrated in FIGS. 1-9, one or more of the elements, processes and/or devices illustrated in FIG. 4 may be combined, divided, re-arranged, omitted, eliminated and/or implemented in any other way. Further, the example signal extender drones 105 and/or 105A-C, the example drone transport units 110 and/or 110A-C, the example signal extenders 115 and/or 115A-C, the example docking stations 120A-C, the example drone controller 125, the example device clients 130 and/or 130A-B, the example wireless devices 135A-B and/or 140, the example communication transceiver(s) 705 and/or 805, the example drone configurer 710, the example policy configurer 715, the example configuration data storage 720, the example device manager 725, the example drone manager 730, the example drone operation controller 810, the example power source monitor 815, the example device monitor 820, the example signal extender controller 825, the example connection monitor 905, the example drone controller interface 910, the example drone extension authorizer 915, the example drone interface 920, the example extension status indicator 925 and/or, more generally, the example wireless signal extension system 100 of FIGS. 1-9 may be implemented by hardware, software, firmware and/or any combination of hardware, software and/or firmware. Thus, for example, any of the example signal extender drones 105 and/or 105A-C, the example drone transport units 110 and/or 110A-C, the example signal extenders 115 and/or 115A-C, the example docking stations 120A-C, the example drone controller 125, the example device clients 130 and/or 130A-B, the example wireless devices 135A-B and/or 140, the example communication transceiver(s) 705 and/or 805, the example drone configurer 710, the example policy configurer 715, the example configuration data storage 720, the example device manager 725, the example drone manager 730, the example drone operation controller 810, the example power source monitor 815, the example device monitor 820, the example signal extender controller 825, the example connection monitor 905, the example drone controller interface 910, the example drone extension authorizer 915, the example drone interface 920, the example extension status indicator 925 and/or, more generally, the example wireless signal extension system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wireless signal extension system 100, the example signal extender drones 105 and/or 105A-C, the example drone transport units 110 and/or 110A-C, the example signal extenders 115 and/or 115A-C, the example docking stations 120A-C, the example drone controller 125, the example device clients 130 and/or 130A-B, the example wireless devices 135A-B and/or 140, the example communication transceiver(s) 705 and/or 805, the example drone configurer 710, the example policy configurer 715, the example configuration data storage 720, the example device manager 725, the example drone manager 730, the example drone operation controller 810, the example power source monitor 815, the example device monitor 820, the example signal extender controller 825, the example connection monitor 905, the example drone controller interface 910, the example drone extension authorizer 915, the example drone interface 920 and/or the example extension status indicator 925 is/are hereby expressly defined to include a tangible computer readable storage device or storage disk such as a memory, a digital versatile disk (DVD), a compact disk (CD), a Blu-ray disk, etc. storing the software and/or firmware. Further still, the example wireless signal extension system 100 may include one or more elements, processes and/or devices in addition to, or instead of, those illustrated in FIGS. 1-9, and/or may include more than one of any or all of the illustrated elements, processes and devices.

Flowcharts representative of example machine readable instructions for implementing the example wireless signal extension system 100, the example signal extender drones 105 and/or 105A-C, the example drone transport units 110 and/or 110A-C, the example signal extenders 115 and/or 115A-C, the example docking stations 120A-C, the example drone controller 125, the example device clients 130 and/or 130A-B, the example wireless devices 135A-B and/or 140, the example communication transceiver(s) 705 and/or 805, the example drone configurer 710, the example policy configurer 715, the example configuration data storage 720, the example device manager 725, the example drone manager 730, the example drone operation controller 810, the example power source monitor 815, the example device monitor 820, the example signal extender controller 825, the example connection monitor 905, the example drone controller interface 910, the example drone extension authorizer 915, the example drone interface 920 and/or the example extension status indicator 925 are shown in FIGS. 10-15. In these examples, the machine readable instructions comprise one or more programs for execution by a processor, such as the processors 1612, 1712 and/or 1812 shown in the example processor platform 1600, 1700 and/or 1800 discussed below in connection with FIGS. 16-18. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1612, 1712 and/or 1812, but the entire program or programs and/or portions thereof could alternatively be executed by a device other than the processor 1612, 1712 and/or 1812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 10-15, many other methods of implementing the example wireless signal extension system 100, the example signal extender drones 105 and/or 105A-C, the example drone transport units 110 and/or 110A-C, the example signal extenders 115 and/or 115A-C, the example docking stations 120A-C, the example drone controller 125, the example device clients 130 and/or 130A-B, the example wireless devices 135A-B and/or 140, the example communication transceiver(s) 705 and/or 805, the example drone configurer 710, the example policy configurer 715, the example configuration data storage 720, the example device manager 725, the example drone manager 730, the example drone operation controller 810, the example power source monitor 815, the example device monitor 820, the example signal extender controller 825, the example connection monitor 905, the example drone controller interface 910, the example drone extension authorizer 915, the example drone interface 920 and/or the example extension status indicator 925 may alternatively be used. For example, with reference to the flowcharts illustrated in FIGS. 10-15, the order of execution of the blocks may be changed, and/or some of the blocks described may be changed, eliminated, combined and/or subdivided into multiple blocks.

As mentioned above, the example processes of FIGS. 10-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10-15 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 10:
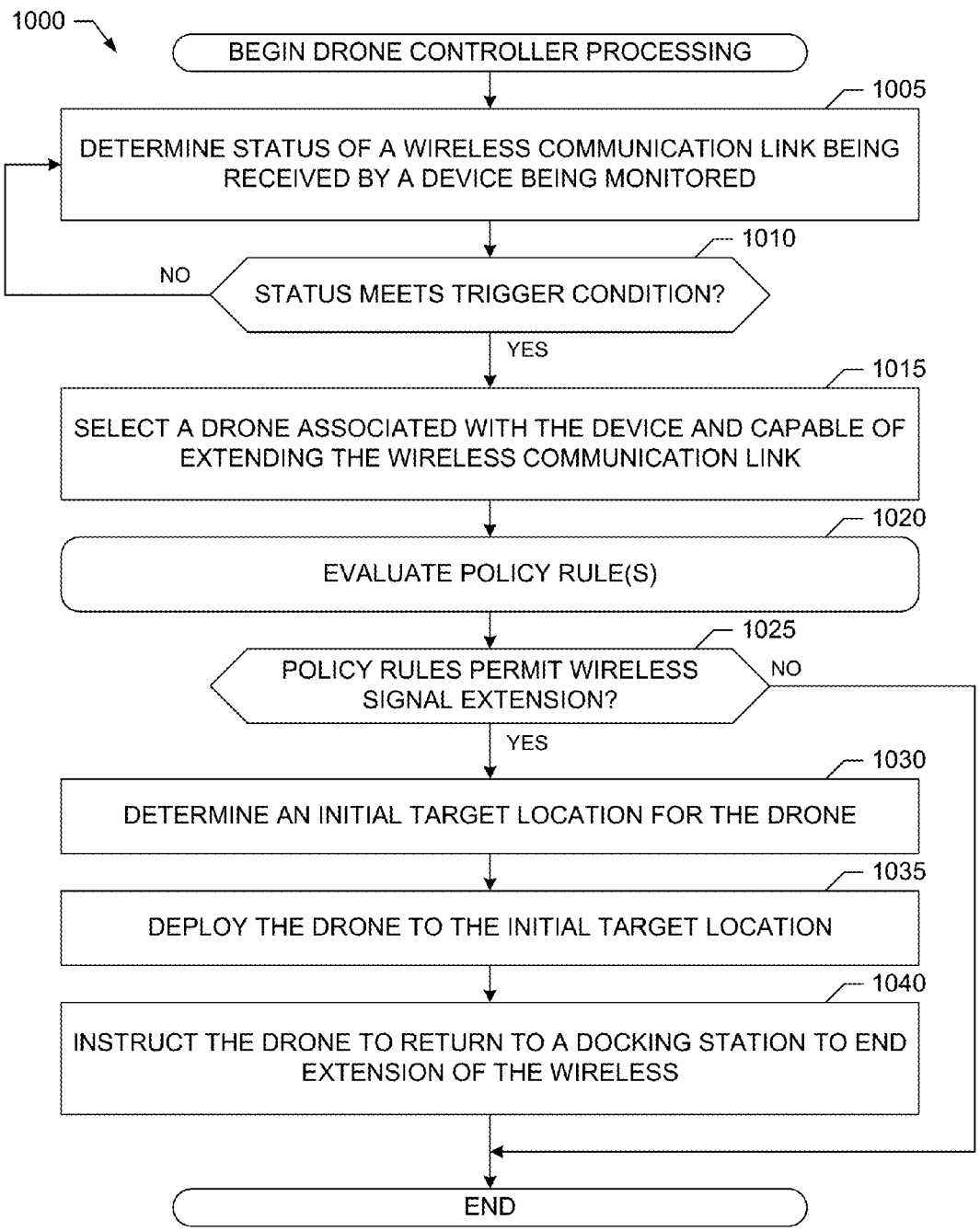
FIGS. 10-13 are flowcharts representative of example machine readable instructions that may be executed to implement the example drone controller of FIGS. 1 and/or 7.

A first example program 1000 that may be executed to implement the example drone controller 125 of FIGS. 1-7 is represented by the flowchart shown in FIG. 10. With reference to the preceding figures and associated written descriptions, the example program 1000 of FIG. 10 begins execution at block 1005 at which the example device manager 725 of the drone controller 125 determines a status of a wireless communication link being received by a wireless device (e.g., from another device, such as an access point) for which wireless signal extension service can be provided. At block 1010, the device manager 725 determines whether the status of the wireless communication link meets a trigger condition. If the status meets the trigger condition (block 1010), at block 1015, the example drone manager 730 selects, based on drone configuration data stored by the example drone configurer 710 of the drone controller 125, a one or more of the signal extender drones 105 and/or 105A-C associated with (e.g., assigned to) the monitored wireless device and capable of extending the wireless communication link.

At block 1020, the drone manager 730 evaluates, based on policy configuration data stored by the example policy configurer 715 of the drone controller 125, one or more policy rules to determine whether the signal extender drone(s) selected at block 1015 is(are) permitted to be deployed under the present operating scenario. Example instructions to implement the processing at block 1020 are illustrated in FIG. 11, which is described in further detail below.

If the policy rules permit wireless signal extension under the present operating scenario (block 1025), processing proceeds to block 1030 and blocks subsequent thereto. At block 1030, the drone manager 730 determines an initial target location for a signal extender drone selected at block 1015. For example, at block 1030, the drone manager 730 determines the initial target location based on the location of the monitored wireless device (e.g., as obtained from reported positioning data), and the location of the other device (e.g., an access point or other device, whose location is obtained from stored configuration data) that is the source of the communication links to be extended. At block 1035, the drone manager 730 sends one or more instructions (e.g., such as an initiate instruction, instructions including map coordinates and/or navigation waypoints, etc.) to the selected signal extender drone to deploy the drone to the initial target location determined at block 1030. Sometime thereafter (e.g., when the drone exhibits a low batter condition, when the communication link no longer needs to be extended, etc.), at block 1040, the drone manager 730 instructs the deployed signal extender drone to return to a docking station to end the wireless signal extension service being provided by the drone. Execution of the example program 1000 then ends.

Figure 11:
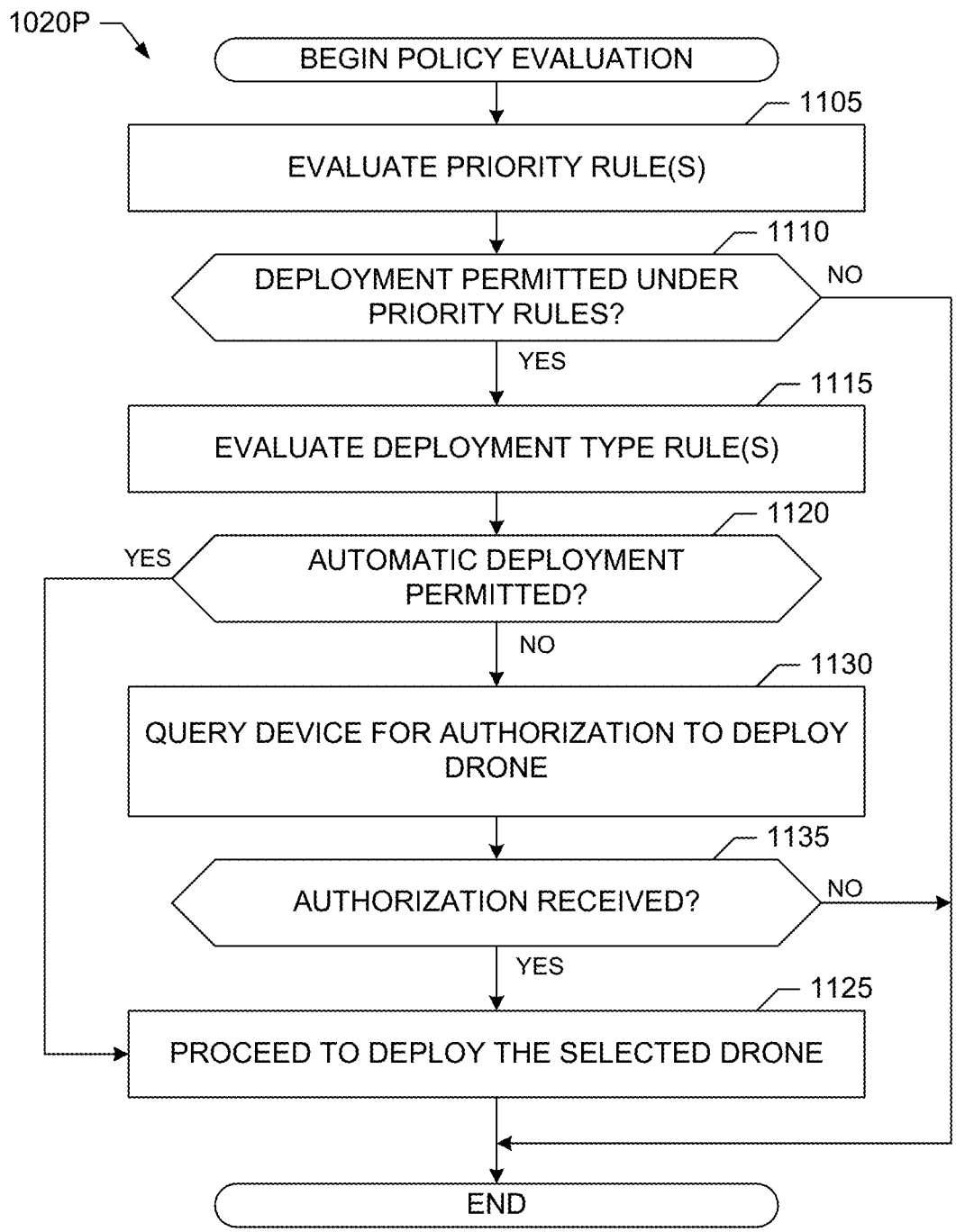

An example program 1020P capable of performing the processing at block 1020 of FIG. 10 is illustrated in FIG. 11. With reference to the preceding figures and associated written descriptions, the example program 1020P begins execution at block 1105 at which the example drone manager 730 of the example drone controller 125 evaluates one or more priority rules included in the policy rules configured by the example policy configurer 715 to determine whether wireless signal extension device is permitted for a monitored wireless device under the current operating scenario. For example, at block 1105, the drone manager 730 may evaluate a device identifier, a user identifier, one or more application identifiers, location data, etc., reported by the monitored wireless device, and/or time-of-day data, etc., against configured priorities to determine whether a selected signal extender drone is permitted to be tasked to provide wireless signal extension service for the wireless device. For example, the drone manager 730 may evaluate a device identifier for the monitored wireless device, a user identifier associated with the monitored wireless device, one or more application identifiers reported for application(s) executing on the monitored wireless device, location data reported for the monitored wireless device, etc., against a device identifier for another wireless device, a user identifier associated with the other wireless device, one or more application identifiers reported for application(s) executing on the other wireless device, location data reported for the other wireless device, etc., as well as time-of-day data, to determine the monitored wireless device or the other wireless device has higher priority for wireless signal extension service (e.g., such as when there are not enough available signal extender drones, or signal extender capacity, to provide service for both the monitored wireless device and the other wireless device).

If drone deployment is permitted by the evaluation of the policy rules (block 1110), processing proceeds to block 1115. At block 1115, the drone manager 730 evaluates one or more deployment type rules included in the policy rules configured by the example policy configurer 715 to determine whether automatic deployment is permitted for the particular combination of the selected signal extender drone and the monitored wireless device. If automatic deployment is permitted (block 1120), processing proceeds to block 1125 at which the drone manager 730 deploys the selected signal extender drone to a determined initial target location.

However, if automatic deployment is not permitted (block 1120), processing proceeds to block 1130 at which the example device manager 725 of the drone controller 125 queries the monitored wireless device for authorization to deploy the selected signal extender drone. If authorization is received from the wireless device (block 1135), processing proceeds to block 1125 at which the drone manager 730 deploys the selected signal extender drone to a determined initial target location. However, if authorization is not received (block 1135), execution of the program ends without the selected signal extender drone being deployed.

Figure 12:
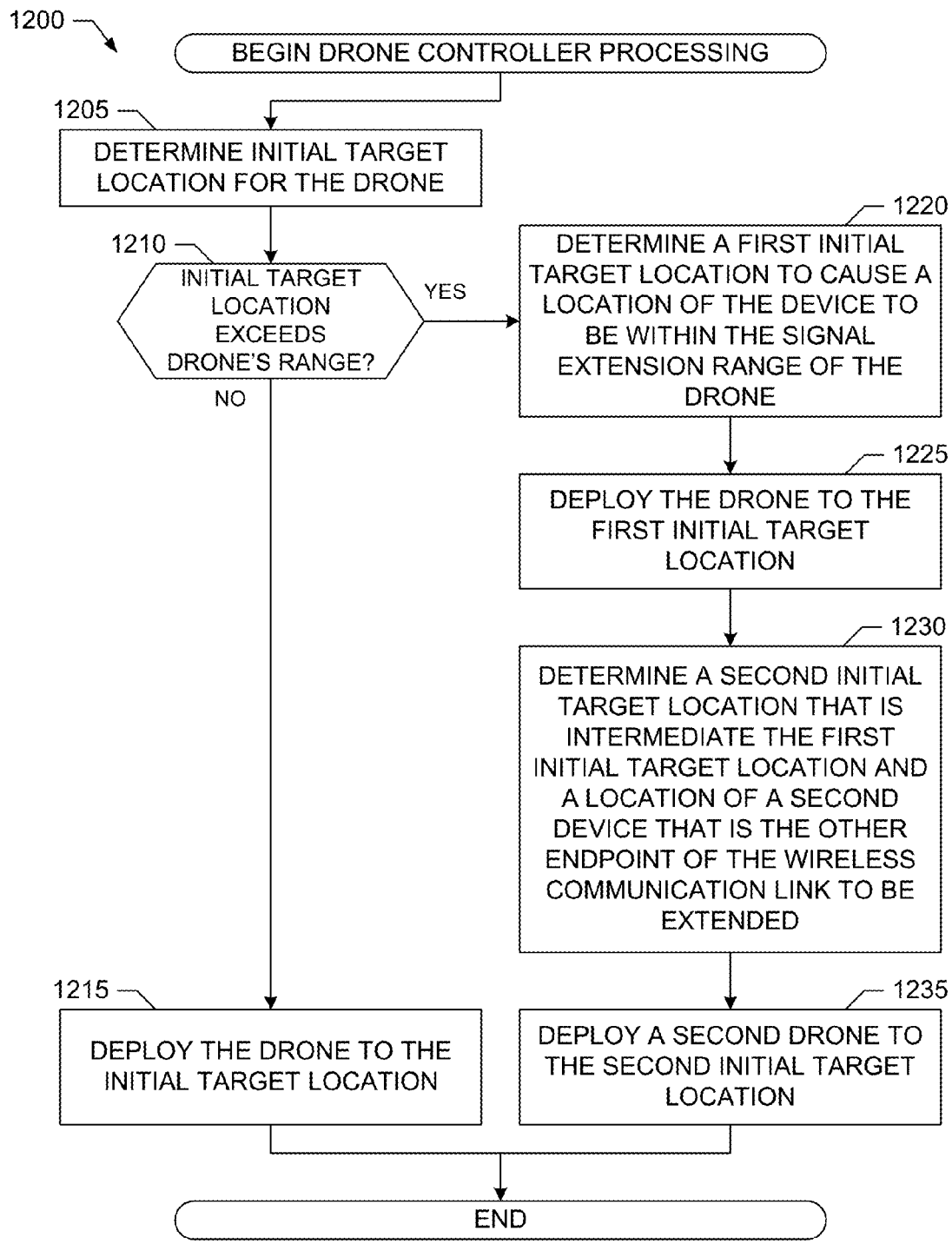

A second example program 1200 that may be executed to implement the example drone controller 125 of FIGS. 1-7 is represented by the flowchart shown in FIG. 12. With reference to the preceding figures and associated written descriptions, the example program 1200 of FIG. 12 begins execution at block 1205 at which the example drone manager 730 of the example drone controller 125 determines, as described above, an initial target location for a signal extender drone that has been selected to provide signal extension service for a monitored wireless device. At block 1210, the drone manager 730 determines, based on drone configuration data stored by the example drone configurer 710 of the drone controller 125, whether the initial target location determined at block 1205 exceeds the signal extension range of the selected signal extender drone. For example, at block 1210, the drone manager 730 may determine that the initial target location exceeds the signal extension range of the selected signal extender drone if a distance between the location of the monitored wireless device and the location of the source device (e.g., access point) of the communication link to be extended exceeds the range of the signal extender of the selected signal extender drone. Additionally or alternatively, at block 1210, the drone manager 730 may determine that the initial target location exceeds the signal extension range of the selected signal extender drone if a distance between the location of the monitored wireless device and the initial target location, or a distance between the location of the source device (e.g., access point) of the communication link and the initial target location, exceeds the range of the signal extender of the selected signal extender drone.

If the drone manager 730 determines that the initial target location does not exceed the signal extension range of the selected signal extender drone (block 1210), processing proceeds to block 1215 at which the drone manager 730 deploys the selected signal extender drone to the initial target location. However, if the drone manager 730 determines that the initial target location does exceed the signal extension range of the selected signal extender drone (block 1210), processing proceeds to block 1220 at which the drone manager 730 determines a first initial target location for the selected signal extender drone to cause the location of the monitored wireless device to be within the signal extension range of the selected signal extender drone (e.g., by moving the first initial target location closer to the location of the monitored wireless device). At block 1225, the drone manager 730 deploys the selected signal extender drone to the first initial target location. At block 1230, the drone manager 730 determines a second initial target location that is intermediate the first initial target location determined at block 1220 and the location of the source device (e.g., access point) of the communication link to be extended. At block 1235, the drone manager 730 deploys a second signal extender drone to the second initial target location. In some examples, the two deployed drones then automatically implement a signal relay chain to extend the communication link. In some examples, the drone manager 730 instructs the two deployed drones to implement the signal relay chain when they arrive at the first and second initial target locations. Execution of the example program 1200 then ends.

Figure 13:
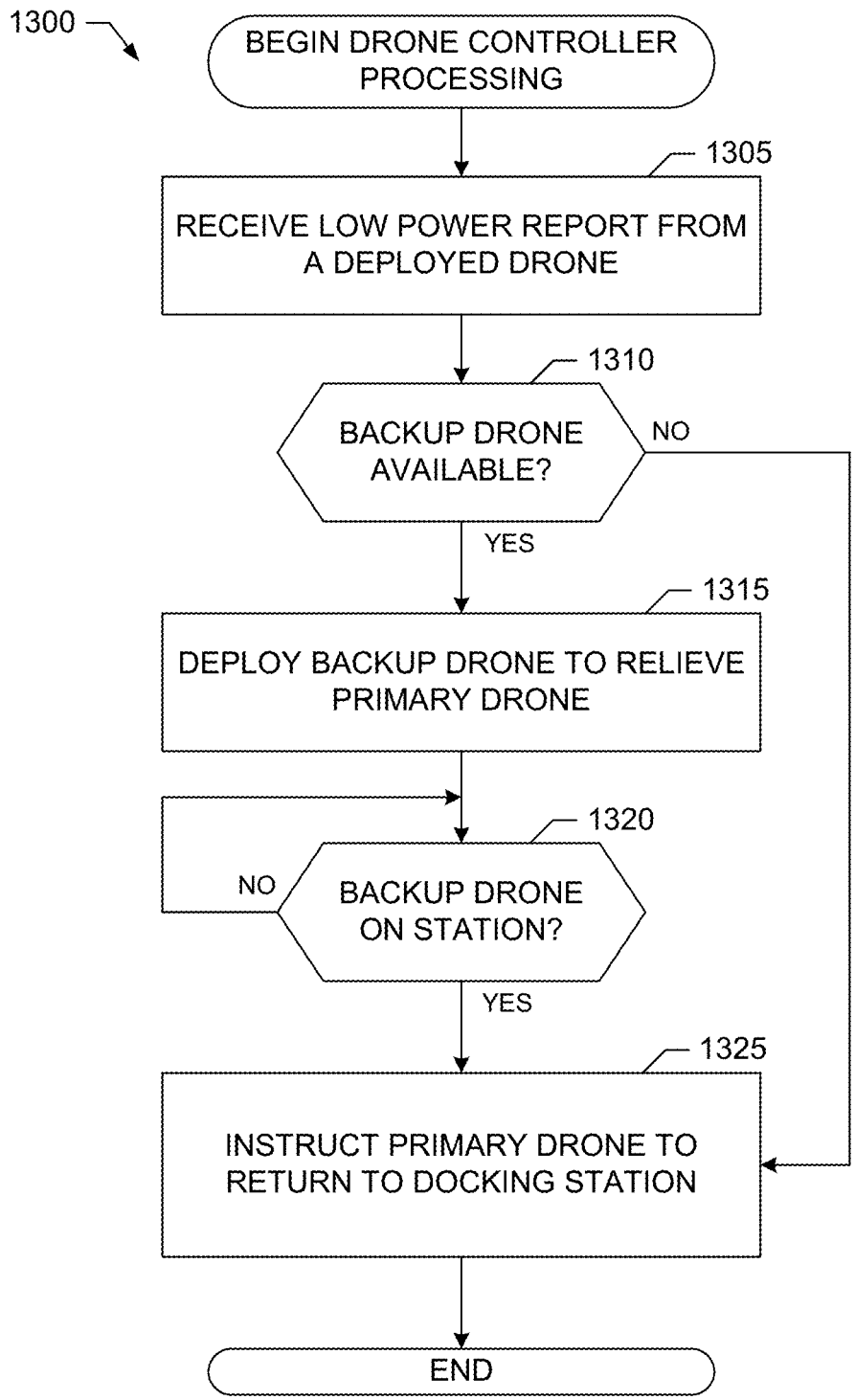

A third example program 1300 that may be executed to implement the example drone controller 125 of FIGS. 1-7 is represented by the flowchart shown in FIG. 13. With reference to the preceding figures and associated written descriptions, the example program 1300 of FIG. 13 begins execution at block 1305 at which the example drone manager 730 of the drone controller 125 receives a low power report (e.g., low battery report, a low propellant report, etc.) from a deployed, primary signal extender drone (or otherwise determines, based on reported power source status, elapsed time of drone operation, etc., that the drone is under a low power condition). At block 1310, the drone manager 730 determines whether a backup signal extender drone is available to relieve the deployed (e.g., primary) signal extender drone. If a backup drone is available (block 1310), at block 1315, the drone manager 730 deploys the backup drone to relieve the primary drone. For example, at block 1315, the drone manager 730 may instruct the backup drone to navigate to the location of the primary drone, and perform an electronic handoff (e.g., if both drones are equipped with signal extenders) or a mechanical handoff (e.g., if the primary drone is to transfer the signal extender to the backup drone). After the drone manager 730 determines the backup drone is on-station and has relieved the primary drone (block 1320), or if no backup drone is available (block 1305), processing proceeds to block 1325 at which the drone controller 125 instructs the primary drone to return to its docking station (e.g., for recharging, refueling, etc.). Execution of the example program 1300 then ends.

Figure 14:
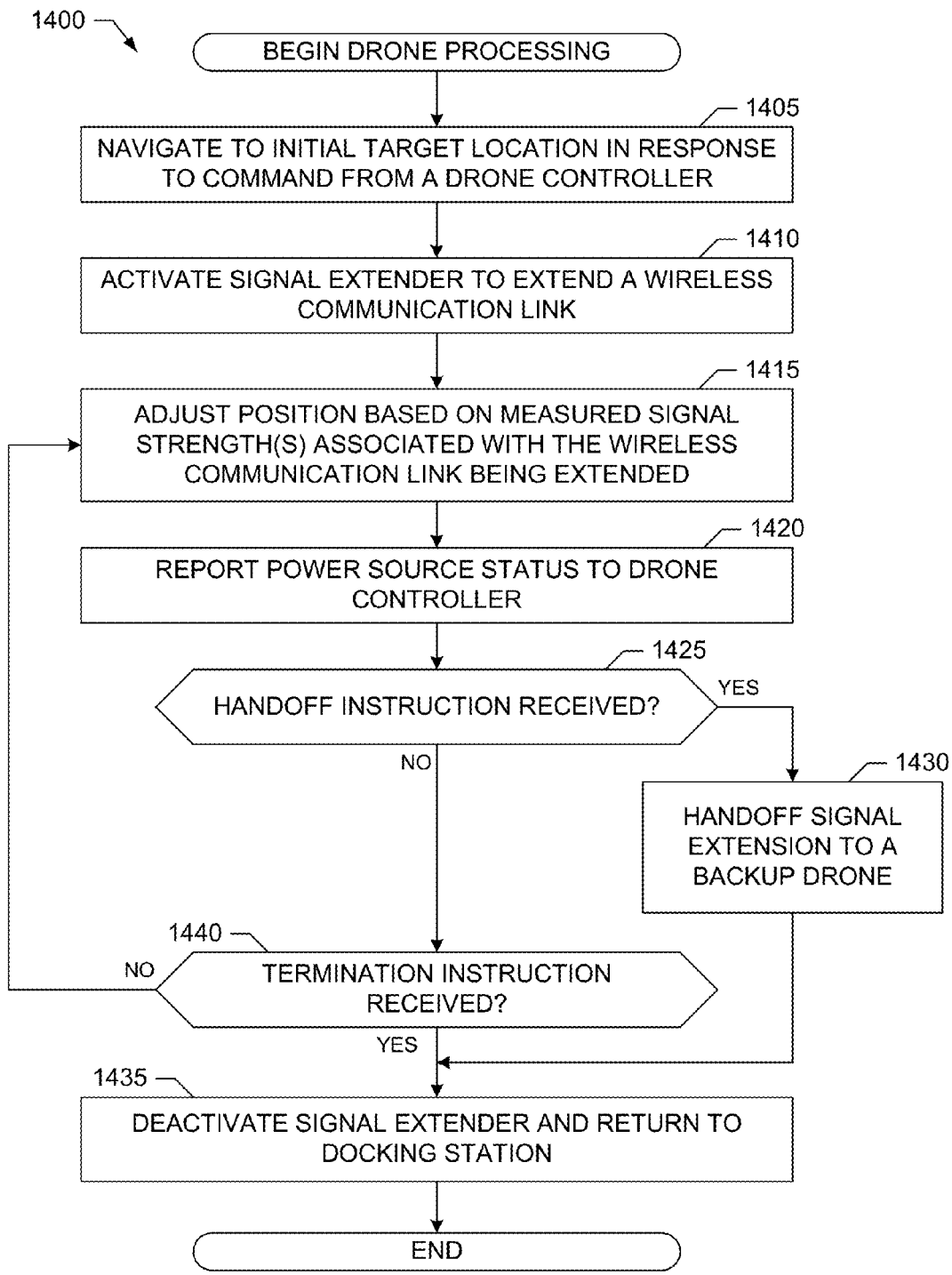
FIG. 14 is a flowchart representative of example machine readable instructions that may be executed to implement the example drone of FIGS. 1 and/or 8.

An example program 1400 that may be executed to implement one or more of the example signal extender drones 105 and/or 105A-C of FIGS. 1-6 and/or 8 is represented by the flowchart shown in FIG. 14. For convenience, and without loss of generality, the example program 1400 is described from the perspective of being executed by the example signal extender drone 105 of FIG. 8. With reference to the preceding figures and associated written descriptions, the example program 1400 of FIG. 14 begins execution at block 1405 at which the example drone operation controller 810 of the signal extender drone 105 navigates the drone 105, in response to one or more commands from the example drone controller 125, to an initial target location to provide signal extension support for a wireless device. For example, at block 1405, the drone operation controller 810 may navigate the drone 105 based on map coordinates, navigation waypoints, etc., provided to the drone operation controller 810 from the drone controller 125, and/or autonomously (or semi-autonomously) based on one or more GPS and/or other sensor(s) included in the signal extender drone 105.

At block 1410, after the drone operation controller 810 determines the signal extender drone 105 has reached the initial target location, the example signal extender controller 825 of the signal extender drone 105 activates the drone's signal extender(s) 115. In some examples, at block 1410, the signal extender controller 825 notifies the wireless device that signal extension service has been enabled. At block 1415, the drone operation controller 810 adjusts the position of the signal extender drone 105 based on measured signal strength, quality, etc., obtained by the example device monitor 820 for the communication link(s) being extended to maintain the communication link(s) at acceptable strength level(s), quality level(s), etc. Additionally or alternatively, at block 1415, the drone operation controller 810 may adjust the position of the signal extender drone 105 based on command(s) received from the drone controller 125, and/or commands received from the wireless device (e.g., to move the drone 105 to a position that is less obtrusive to a user of the wireless device). At block 1420, the example power source monitor 815 reports power source status information (and/or a low power status indication) to the drone controller 125.

At block 1425, the drone operation controller 810 determines whether a signal extension handoff instruction has been received from the drone controller 125. If a signal extension handoff instruction has been received (block 1425), at block 1430, the signal extender controller 825 performs handoff (e.g., automatically or mechanically, as described above) of signal extension service to a backup drone. In some examples, at block 1430, the signal extender controller 825 notifies the wireless device that signal extension service is undergoing handoff. Processing then proceeds to block 1435 at which the signal extender controller 825 deactivates the signal extender(s) 115 of the signal extender drone 105 (e.g., if the backup drone is equipped with its own signal extender(s)) and the drone operation controller 810 navigates the drone 105 back to its docking station.

However, if a signal extension handoff instruction has not been received (block 1425), at block 1440, the drone operation controller 810 determines whether a service termination instruction has been received from the drone controller 125. If a service termination instruction has not been received (block 1440), then processing returns to block 1415 and blocks subsequent thereto to permit the signal extender drone 105 to continue providing signal extension service. However, if a service termination instruction has been received (block 1440), then processing proceeds to block 1435 at which the signal extender controller 825 deactivates the signal extender(s) 115 of the signal extender drone 105 and the drone operation controller 810 navigates the drone 105 back to its docking station. In some examples, at block 1435, the signal extender controller 825 notifies the wireless device that signal extension service has been disabled. Execution of the example program 1400 then ends.

Figure 15:
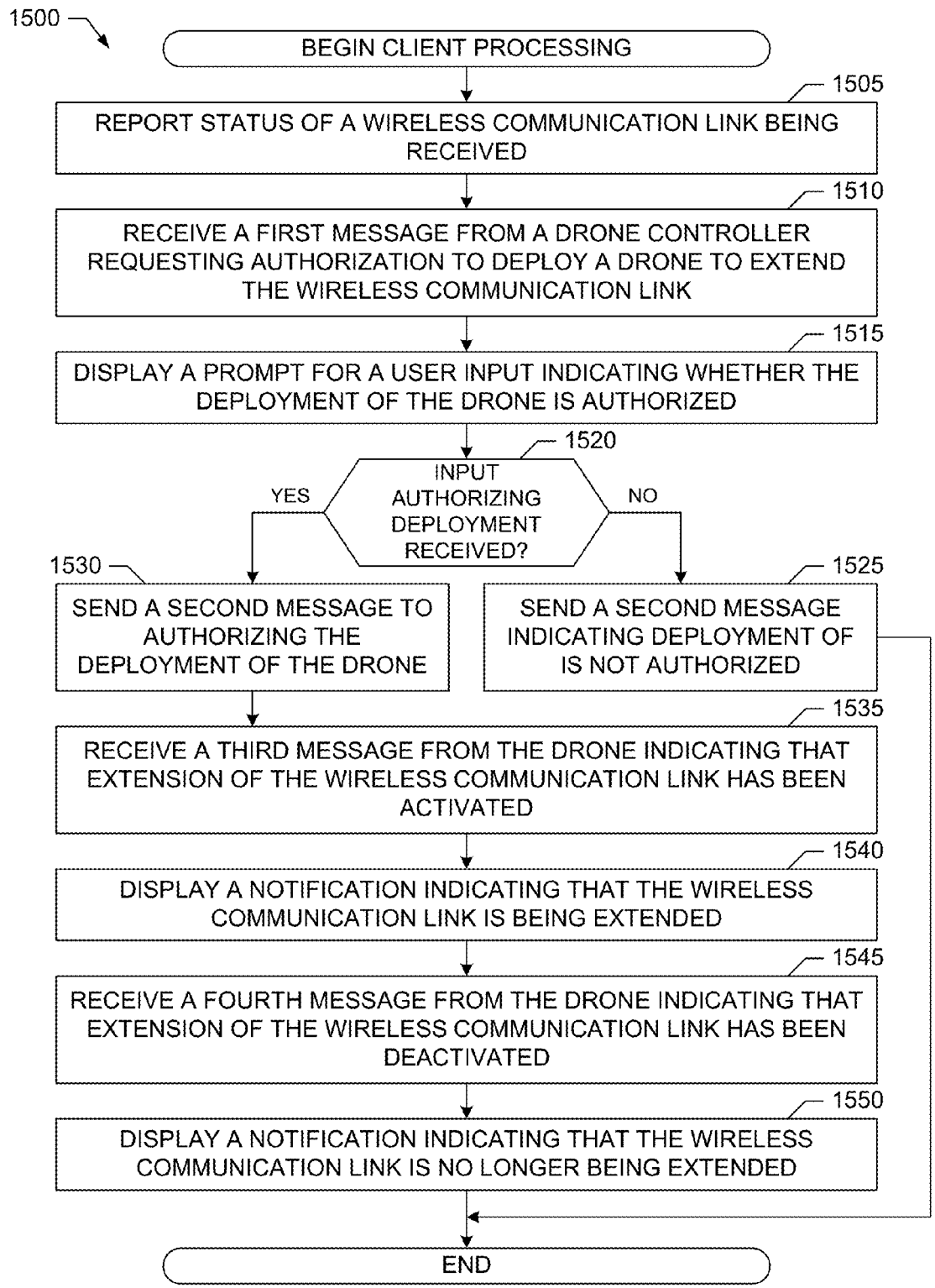
FIG. 15 is a flowchart representative of example machine readable instructions that may be executed to implement the example device client of FIGS. 1 and/or 9.

An example program 1500 that may be executed to implement one or more of the example device clients 130 and/or 130A-B of FIGS. 1-6 and/or 9 is represented by the flowchart shown in FIG. 15. For convenience, and without loss of generality, the example program 1500 is described from the perspective of being executed by the example device client 130 of FIG. 9. With reference to the preceding figures and associated written descriptions, the example program 1500 of FIG. 15 begins execution at block 1505 at which the example drone controller interface 910 of the device client 130 reports, to the drone controller 125, status of a wireless communication link being received by a wireless device executing or otherwise implementing the device client 130. For example, the reported status may be determined by the example connection monitor 905 of the device client 130. At block 1510, the drone controller interface 910 receives a first message (e.g., a query message) from the drone controller 125 requesting authorization to deploy a signal extender drone (e.g., such as one or more of the drones 105 and/or 105A-C) to provide signal extension service for the wireless communication link. At block 1515, the example drone extension authorizer 915 of the device client 130 displays, in response to the query message, a prompt for a user input indicating whether drone deployment is authorized.

If the user input indicates that deployment is not authorized (block 1520), at block 1525 the drone extension authorizer 915 responds to the query message by sending, via the drone controller interface 910, a second message (e.g., a response message) indicating that drone deployment is not authorized. If, however, the user input indicates that deployment is authorized (block 1520), at block 1530 the drone extension authorizer 915 responds to the query message by sending, via the drone controller interface 910, a second message (e.g., a response message) indicating that drone deployment is authorized.

At block 1535, the example drone interface 920 of the device client 130 receives a third message (e.g., an activation notification message) from a deployed signal extender drone indicating that extension of the wireless communication link has been activated/enabled. In response to this message, at block 1540, the example extension status indicator 925 of the device client 130 displays a notification indicating that extension of the wireless communication link has been activated/enabled. Sometime thereafter, at block 1545, the example drone interface 920 of the device client 130 receives a fourth message (e.g., a deactivation notification message) from the deployed signal extender drone indicating that extension of the wireless communication link has been deactivated/disabled. In response to this message, at block 1550, the example extension status indicator 925 of the device client 130 displays a notification indicating that extension of the wireless communication link has been deactivated/disabled. Execution of the example program 1500 then ends.

Figure 16:
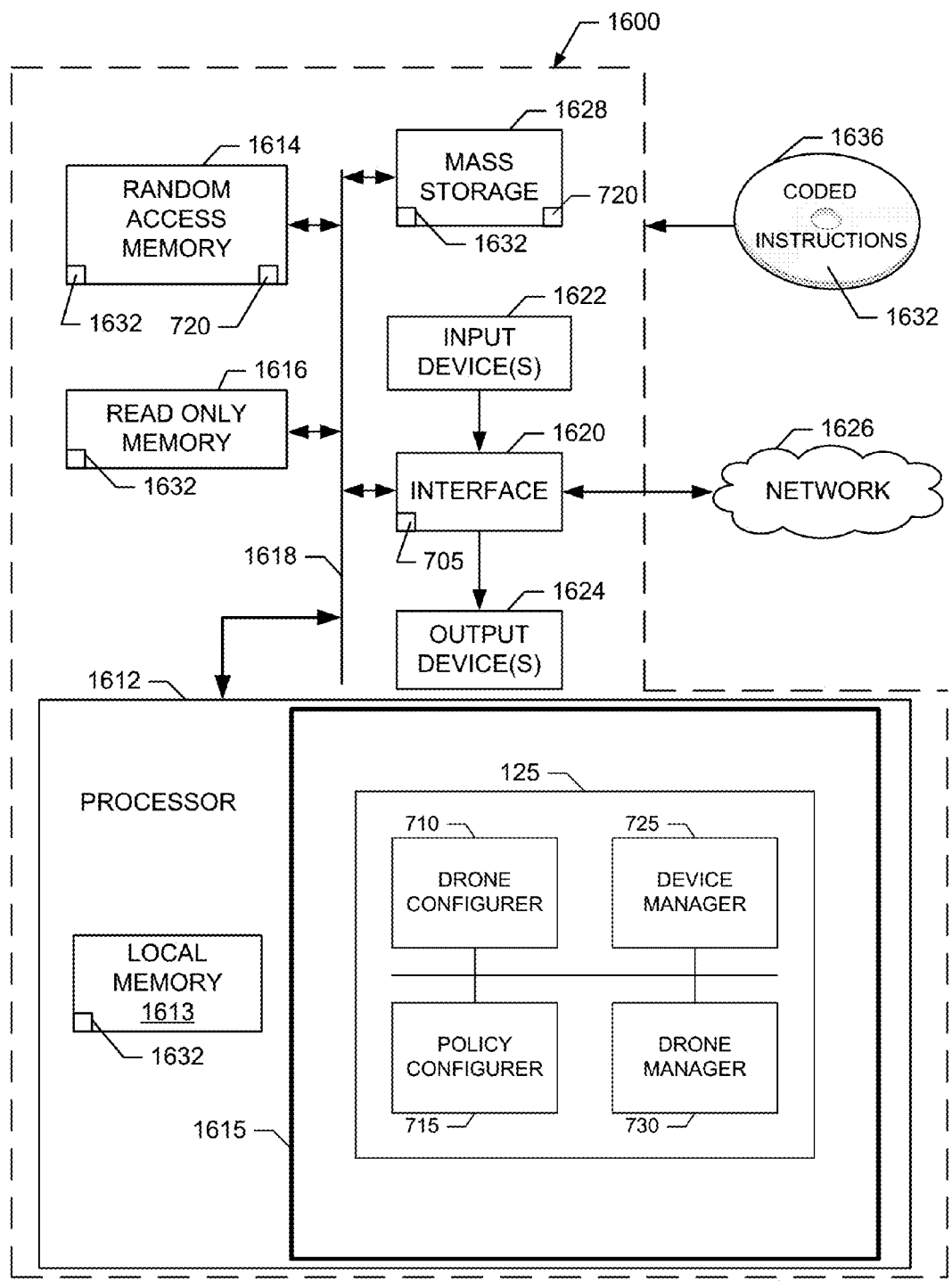
FIG. 16 is a block diagram of an example processor platform structured to execute the example machine readable instructions of FIGS. 10-12 and/or 13 to implement the example drone controller of FIGS. 1 and/or 7.

FIG. 16 is a block diagram of an example processor platform 1600 capable of executing the instructions of FIGS. 10, 11, 12 and/or 13 to implement the example drone controller 125 of FIGS. 1-7. The processor platform 1600 can be, for example, a server, a personal computer, a mobile device (e.g., a cell phone, a smart phone, a tablet such as an iPad™), an Internet appliance, a gaming device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. In the illustrated example of FIG. 16, the processor 1612 includes one or more example processing cores 1615 configured via example instructions 1632, which include the example instructions of FIGS. 10, 11, 12 and/or 13, to implement the example drone configurer 710, the example policy configurer 715, the example device manager 725 and/or the example drone manager 730 of FIG. 7.

The processor 1612 of the illustrated example includes a local memory 1613 (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1600, can allow the user to control the computer system and provide data to the computer using physical gestures, such as, but not limited to, hand or body movements, facial expressions, and face recognition.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). In the illustrated example of FIG. 16, the interface circuit 1620 is also structured to implement the example communication transceiver(s) 705 of FIG. 7.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID (redundant array of independent disks) systems, and digital versatile disk (DVD) drives. In some examples, the mass storage device(s) 1628 may implement the example configuration data storage 720. Additionally or alternatively, in some examples the volatile memory 1614 may implement the example configuration data storage 720.

Coded instructions 1632 corresponding to the instructions of FIGS. 10, 11, 12 and/or 13 may be stored in the mass storage device 1628, in the volatile memory 1614, in the non-volatile memory 1616, in the local memory 1613 and/or on a removable tangible computer readable storage medium, such as a CD or DVD 1636.

Figure 17:
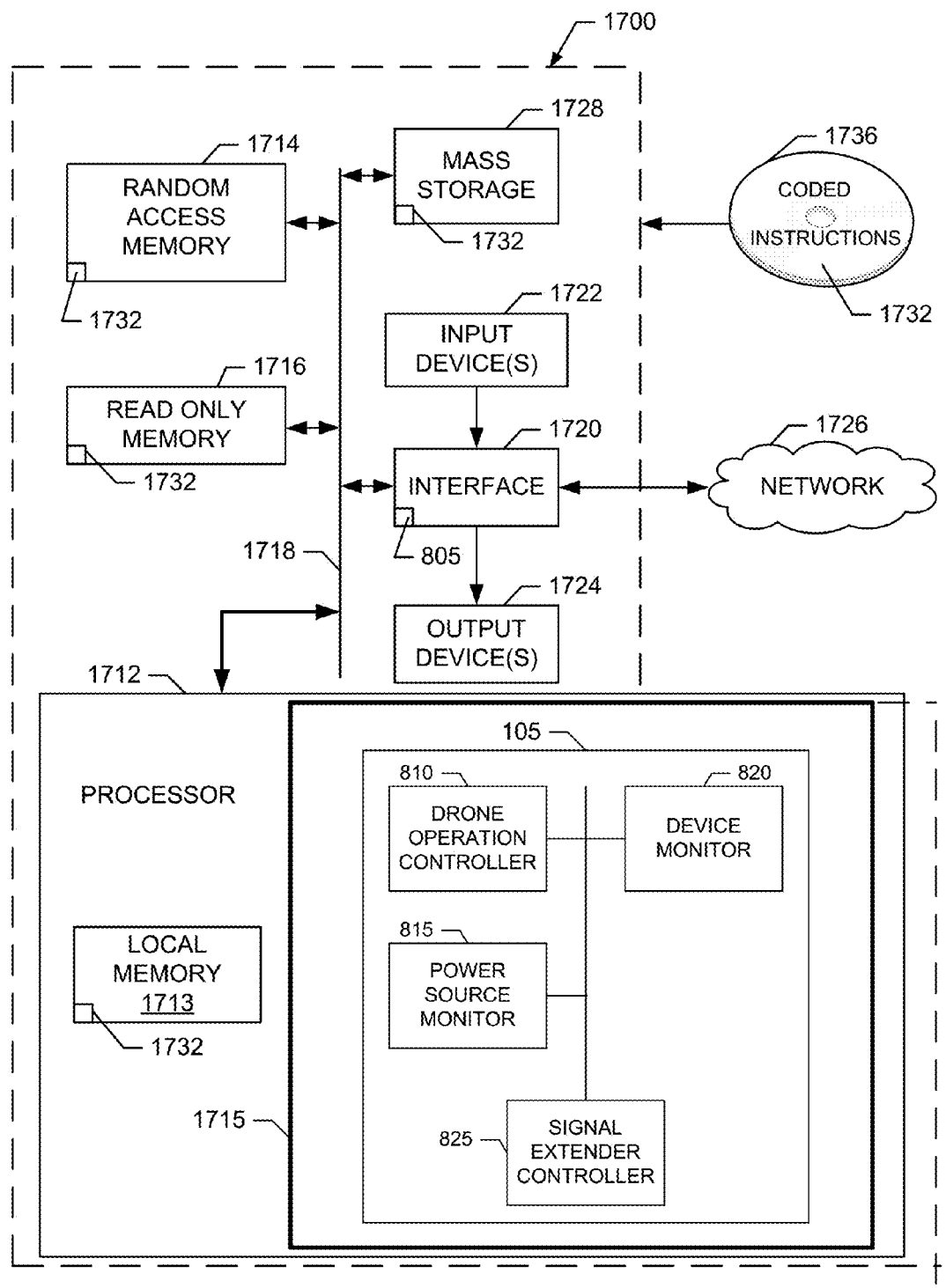
FIG. 17 is a block diagram of an example processor platform structured to execute the example machine readable instructions of FIG. 14 to implement the example drone of FIGS. 1 and/or 8.

FIG. 17 is a block diagram of an example processor platform 1700 capable of executing the instructions of FIG. 14 to implement the example signal extender drones 105 and/or 105A-C of FIGS. 1-6 and/or 8. The processor platform 1700 can be, for example, a mobile device (e.g., a cell phone, a smart phone, a tablet such as an iPad™), an Internet appliance, a gaming device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer. In the illustrated example of FIG. 17, the processor 1712 includes one or more example processing cores 1715 configured via example instructions 1732, which include the example instructions of FIG. 14, to implement the example drone operation controller 810, the example power source monitor 815, the example device monitor 820 and/or the example signal extender controller 825 of FIG. 8.

The processor 1712 of the illustrated example includes a local memory 1713 (e.g., a cache). The processor 1712 of the illustrated example is in communication with a main memory including a volatile memory 1714 and a non-volatile memory 1716 via a link 1718. The link 1718 may be implemented by a bus, one or more point-to-point connections, etc., or a combination thereof. The volatile memory 1714 may be implemented by SDRAM, DRAM, RDRAM and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a USB interface, and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keypad, a button, a touchscreen, a track-pad, a trackball, a trackbar (such as an isopoint), a voice recognition system and/or any other human-machine interface. Also, many systems, such as the processor platform 1700, can allow the user to control the computer system and provide data to the computer using physical gestures, such as, but not limited to, hand or body movements, facial expressions, and face recognition.

One or more output devices 1724 are also connected to the interface circuit 1720 of the illustrated example. The output devices 1724 can be implemented, for example, by display devices (e.g., an LED, an OLED, a liquid crystal display, a CRT display, a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a DSL, a telephone line, coaxial cable, a cellular telephone system, etc.). In the illustrated example of FIG. 17, the interface circuit 1720 is also structured to implement the example communication transceiver(s) 805 of FIG. 8.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and DVD drives.

Coded instructions 1732 corresponding to the instructions of FIG. 14 may be stored in the mass storage device 1728, in the volatile memory 1714, in the non-volatile memory 1716, in the local memory 1713 and/or on a removable tangible computer readable storage medium, such as a CD or DVD 1736.

Figure 18:
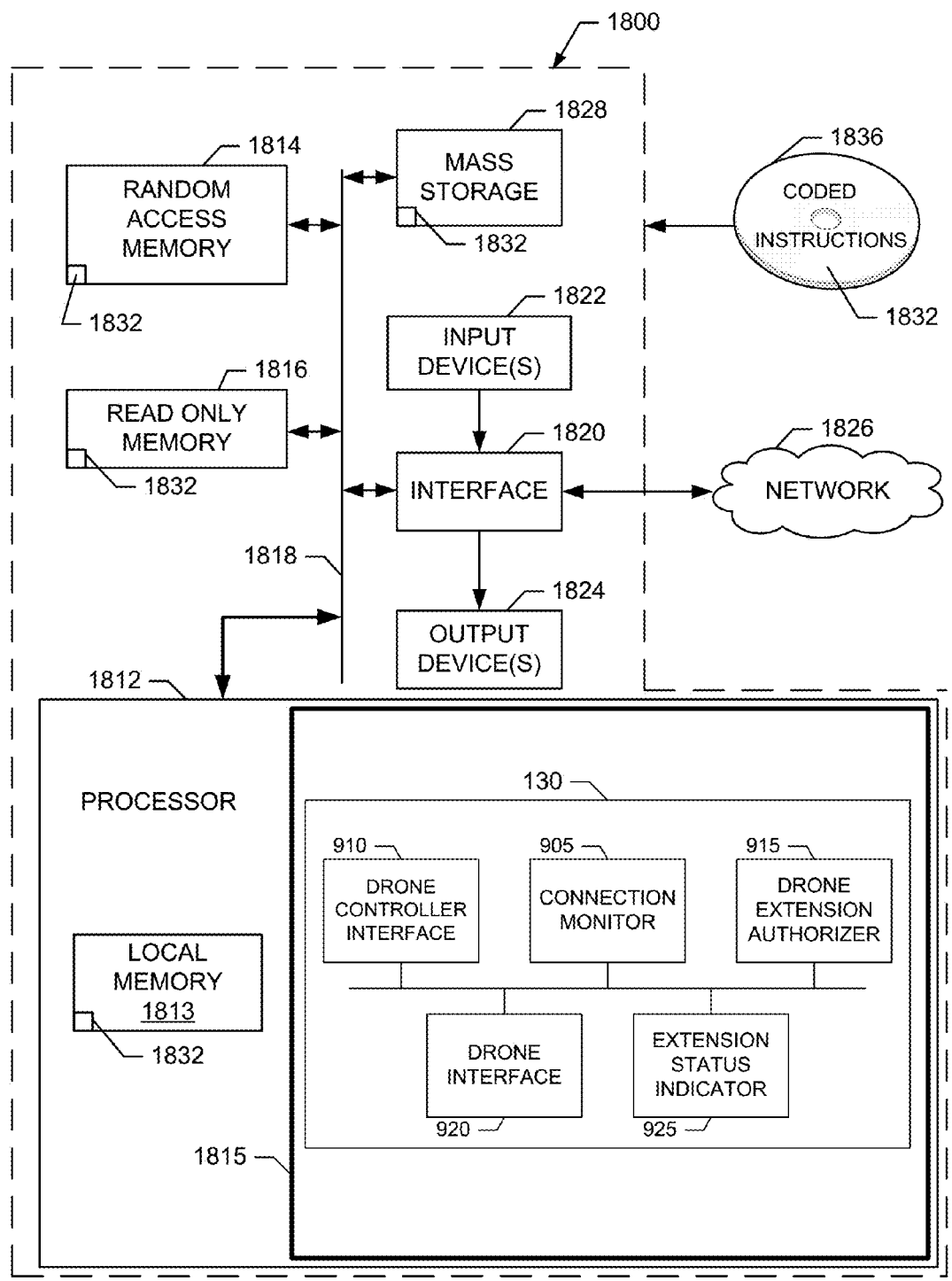
FIG. 18 is a block diagram of an example processor platform structured to execute the example machine readable instructions of FIG. 14 to implement the example client device of FIGS. 1 and/or 9.

FIG. 18 is a block diagram of an example processor platform 1800 capable of executing the instructions of FIG. 15 to implement the example device clients 130 and/or 130A-B of FIGS. 1-6 and/or 9. The processor platform 1800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer. In the illustrated example of FIG. 18, the processor 1812 includes one or more example processing cores 1815 configured via example instructions 1832, which include the example instructions of FIG. 15, to implement the example connection monitor 905, the example drone controller interface 910, the example drone extension authorizer 915, the example drone interface 920 and/or the example extension status indicator 925 of FIG. 9.

The processor 1812 of the illustrated example includes a local memory 1813 (e.g., a cache). The processor 1812 of the illustrated example is in communication with a main memory including a volatile memory 1814 and a non-volatile memory 1816 via a link 1818. The link 1818 may be implemented by a bus, one or more point-to-point connections, etc., or a combination thereof. The volatile memory 1814 may be implemented by SDRAM, DRAM, RDRAM and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a USB interface, and/or a PCI express interface.

In the illustrated example, one or more input devices 1822 are connected to the interface circuit 1820. The input device(s) 1822 permit(s) a user to enter data and commands into the processor 1812. The input device(s) can be implemented by, for example, an audio sensor, a microphone, a camera (still or video), a keypad, a button, a touchscreen, a track-pad, a trackball, a trackbar (such as an isopoint), a voice recognition system and/or any other human-machine interface. Also, many systems, such as the processor platform 1800, can allow the user to control the computer system and provide data to the computer using physical gestures, such as, but not limited to, hand or body movements, facial expressions, and face recognition.

One or more output devices 1824 are also connected to the interface circuit 1820 of the illustrated example. The output devices 1824 can be implemented, for example, by display devices (e.g., an LED, an OLED, a liquid crystal display, a CRT display, a touchscreen, a tactile output device, a printer and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a DSL, a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and DVD drives.

Coded instructions 1832 corresponding to the instructions of FIG. 15 may be stored in the mass storage device 1828, in the volatile memory 1814, in the non-volatile memory 1816, in the local memory 1813 and/or on a removable tangible computer readable storage medium, such as a CD or DVD 1836.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to extend wireless signal coverage, the method comprising:
   determining, with a processor, whether a status of a wireless communication link meets a trigger condition, the wireless communication link being a link between a first device and a second device;
   selecting a drone from a plurality of available drones based on a type of the wireless communication link and an identifier of the first device, wherein respective ones of the available drones are associated with respective types of wireless communication links, and wherein the respective ones of the available drones are assigned to support respective ones of a plurality of devices including the first device; and
   after determining the status meets the trigger condition, deploying, with the processor, the drone selected from the plurality of the available drones to a target location determined based on a first device location associated with the first device and a second device location associated with the second device, the drone being equipped with a signal extender capable of extending the wireless communication link.

2. The method of claim 1, further comprising, after determining the status meets the trigger condition:

sending a first message to the first device to request authorization to deploy the drone; and deploying the drone to the target location in response to receiving a second message from the first device authorizing deployment of the drone.

3. The method of claim 2, wherein the drone is a first drone, the signal extender is a first signal extender, the target location is a first target location, and further comprising, in response to receiving the second message and determining a distance between the first device location and the second device location exceeds a signal extension range of the first drone:

determining the first target location to cause the first device location to be within the signal extension range of the first drone;

determining a second target location intermediate the first target location and the second device location;

deploying the first drone to the first target location; and deploying a second drone equipped with a second signal extender capable of extending the wireless communication link to the second target location.

4. The method of claim 1, wherein the status of the wireless communication link includes a received signal strength associated with the wireless communication link, the status is determined to meet the trigger condition when the received signal strength is below a threshold, and further comprising determining the received signal strength from a measurement received from the first device.

5. The method of claim 1, further comprising:

determining whether deployment of the drone is configured to be automatic;

when the deployment of the drone is configured to be automatic, deploying the drone to the target location automatically in response to determining the status meets the trigger condition; or when the deployment of the drone is not configured to be automatic:

sending a first message to the first device to request authorization to deploy the drone; and deploying the drone to the target location in response to receiving a second message from the first device authorizing deployment of the drone.

6. The method of claim 1, wherein the status is a first status, the wireless communication link is a first wireless communication link, the target location is a first target location, and further comprising:

determining whether a second status of a second wireless communication link meets the trigger condition, the second wireless communication link being a link between a third device and the second device; and after determining the second status meets the trigger condition:

redeploying the drone from the first target location to a second target location determined based on a third device location associated with the third device and the second device location associated with the second device in response to determining the third device has a higher priority than the first device; and maintaining the drone at the first target location in response to determining the first device has a higher priority than the third device.

7. The method of claim 6, further comprising:

identifying a first application that is active on the first device;

identifying a second application that is active on the third device; and determining whether the second application is configured to have a higher priority than the first application to determine whether the third device has a higher priority than the first device.

8. A non-transitory computer readable storage medium comprising computer readable instructions which, when executed, cause a processor to perform operations comprising:

determining whether a status of a wireless communication link meets a trigger condition, the wireless communication link being a link between a first device and a second device;

after determining the status meets the trigger condition, sending a first message to the first device to request authorization to deploy a drone; and deploying, in response to receiving a second message from the first device authorizing deployment of the drone, the drone to a target location determined based on a first device location associated with the first device and a second device location associated with the second device, the drone being equipped with a signal extender capable of extending the wireless communication link.

9. The non-transitory computer readable storage medium of claim 8, wherein the drone is a first drone, the signal extender is a first signal extender, the target location is a first target location, and the operations further comprise, in response to receiving the second message and determining a distance between the first device location and the second device location exceeds a signal extension range of the first drone:

determining the first target location to cause the first device location to be within the signal extension range of the first drone;

determining a second target location intermediate the first target location and the second device location;

deploying the first drone to the first target location; and deploying a second drone equipped with a second signal extender capable of extending the wireless communication link to the second target location.

10. The non-transitory computer readable storage medium of claim 8, wherein the operations further comprise:

determining whether deployment of the drone is configured to be automatic;

when the deployment of the drone is configured to be automatic, deploying the drone to the target location automatically in response to determining the status meets the trigger condition; or when the deployment of the drone is not configured to be automatic:

sending the first message to the first device to request authorization to deploy the drone; and deploying the drone to the target location in response to receiving the second message from the first device authorizing deployment of the drone.

11. The non-transitory computer readable storage medium of claim 8, wherein the operations further comprise:

determining whether a second status of a second wireless communication link meets the trigger condition, the second wireless communication link being a link between a third device and the second device; and after determining the second status meets the trigger condition:

redeploying the drone from first target location to a second target location determined based on a third device location associated with the third device and the second device location associated with the second device in response to determining the third device has a higher priority than the first device; and maintaining the drone at the first target location in response to determining the first device has a higher priority than the third device.

12. The non-transitory computer readable storage medium of claim 11, wherein the operations further comprise:
identifying a first application that is active on the first device;
identifying a second application that is active on the third device; and
determining whether the second application is configured to have a higher priority than the first application to determine whether the third device has a higher priority than the first device.

13. A drone controller comprising:
memory that stores computer readable instructions; and
a processor to execute the computer readable instructions to perform operations including:
determining whether a first status of a first wireless communication link meets a first trigger condition, the first wireless communications link being a link between a first device and a second device;
after determining the first status meets the first trigger condition, deploying a drone to a first target location determined based on a first device location associated with the first device and a second device location associated with the second device, the drone being equipped with a signal extender capable of extending the first wireless communication link;
determining whether a second status of a second wireless communication link being received at a third device from the second device meets a second trigger condition; and
after determining the second status meets the second trigger condition:
redeploying, in response to determining the third device has a higher priority than the first device, the drone from the first target location to a second target location determined based on a third device location associated with the third device and the second device location associated with the second device; and
maintaining the drone at the first target location in response to determining the first device has a higher priority than the third device.

14. The drone controller of claim 13, wherein the operations further include, after determining the first status meets the first trigger condition:
sending a first message to the first device to request authorization to deploy the drone; and
deploying the drone to the first target location in response to receiving a second message from the first device authorizing deployment of the drone.

15. The drone controller of claim 14, wherein the drone is a first drone, the signal extender is a first signal extender, and the operations further include, in response to receiving the second message and determining a distance between the first device location and the second device location exceeds a signal extension range of the first drone:
determining the first target location to cause the first device location to be within the signal extension range of the first drone;
determining a third target location intermediate the first target location and the second device location;
deploying the first drone to the first target location; and
deploying a second drone equipped with a second signal extender capable of extending the first wireless communication link or the second wireless communication link to the third target location.

16. The drone controller of claim 13, wherein the operations further include:
determining whether deployment of the drone is configured to be automatic;
when the deployment of the drone is configured to be automatic, deploying the drone to the first target location automatically in response to determining the first status meets the first trigger condition; or
when the deployment of the drone is not configured to be automatic:
sending a first message to the first device to request authorization to deploy the drone; and
deploying the drone to the first target location in response to receiving a second message from the first device authorizing deployment of the drone.

17. The drone controller of claim 13, wherein the operations further include:
identifying a first application that is active on the first device;
identifying a second application that is active on the third device; and
determining whether the second application is configured to have a higher priority than the first application to determine whether the third device has a higher priority than the first device.

18. The non-transitory computer readable storage medium of claim 8, wherein the drone is selected from a plurality of available drones based on a type of the wireless communication link and an identifier of the first device, wherein respective ones of the available drones are associated with respective types of wireless communication links, and wherein the respective ones of the available drones are assigned to support respective ones of a plurality of devices including the first device.

19. The drone controller of claim 13, wherein the drone is selected from a plurality of available drones based on a type of the first and second wireless communication links and an identifier of the first device, wherein respective ones of the available drones are associated with respective types of wireless communication links, and wherein the respective ones of the available drones are assigned to support respective ones of a plurality of devices including the first device.

20. The drone controller of claim 13, wherein the drone controller is configured to deploy an unmanned aerial vehicle as the drone.

* * * * *